US012798700B2

(12) United States Patent
Cyr et al.

(10) Patent No.: US 12,798,700 B2
(45) Date of Patent: Nov. 17, 2026

(54) TRACKED FORWARDER

(71) Applicant: Prinoth Ltd., St. John (CA)

(72) Inventors: Guillaume Cyr, Granby (CA); Patrick Hebert, Granby (CA); Sylvain Dessureault, Granby (CA)

(73) Assignee: Prinoth Ltd., St. John (CA)

( * ) Notice: Subject to any disclaimer, the term of this patent is extended or adjusted under 35 U.S.C. 154(b) by 439 days.

(21) Appl. No.: 18/497,375

(22) Filed: Oct. 30, 2023

(65) Prior Publication Data

US 2025/0136202 A1 May 1, 2025

(51) Int. Cl.

*B62D 55/06* (2006.01)
*B62D 33/06* (2006.01)
*B60P 3/41* (2006.01)
*B62D 33/02* (2006.01)

(52) U.S. Cl.

CPC ......... *B62D 55/06* (2013.01); *B62D 33/0617* (2013.01); *B60P 3/41* (2013.01); *B62D 33/02* (2013.01)

(58) Field of Classification Search

CPC ...................................................... B62D 55/06

See application file for complete search history.

(56) References Cited

U.S. PATENT DOCUMENTS

| | | | | |
|---|---|---|---|---|
| 6,135,220 A * | 10/2000 | Gleasman | B62D 55/10 | 180/9.1 |
| 8,607,903 B2 * | 12/2013 | Godin | B62D 55/14 | 180/9.1 |
| 9,604,679 B2 * | 3/2017 | Steben | B62D 55/06 | |
| 10,407,112 B2 * | 9/2019 | Marleau | B62D 55/305 | |
| 11,691,682 B2 * | 7/2023 | Marleau | B62D 55/253 | 180/9.1 |
| 2002/0030397 A1 * | 3/2002 | Tamura | B60K 11/04 | 298/17 R |

FOREIGN PATENT DOCUMENTS

| | | | |
|---|---|---|---|
| EP | 4292913 A1 * | 12/2023 | B62D 55/244 |
| WO | WO-2021012030 A1 * | 1/2021 | B62D 12/02 |

* cited by examiner

*Primary Examiner* — Kevin Hurley

(74) *Attorney, Agent, or Firm* — Woodard, Emhardt, Henry, Reeves & Wagner, LLP

(57) ABSTRACT

A tracked vehicle comprises a body extending in a longitudinal direction of the tracked vehicle. The body comprises a front overhang portion and a rear overhang portion. A first plane is defined by the area of contact of the track on the ground. An entirety of the front overhang portion is above a second plane passing through a frontmost point of the bottom run of the track and defining an angle between 15° and 30° with the first plane; and an entirety of the rear overhang portion is above a third plane passing through a rearmost point of the bottom run of the track and defining an angle between 15° and 35° with the first plane. This configuration provides the tracked vehicle with stability even when handling heavy loads over mountainous terrain.

20 Claims, 16 Drawing Sheets

TRACKED FORWARDER

FIELD

This disclosure relates generally to forwarders and, more particularly, to tracked forwarders for operation on mountainous terrain.

BACKGROUND

A forwarder is a forestry vehicle that carries felled logs from the stump to a roadside landing. Unlike a skidder, a forwarder carries logs clear of the ground, which can reduce soil impacts. Such impacts are reduced further by the use of tracks instead of wheels, and this is particularly important when greater loads are carried.

However, with greater load carrying capacity comes a greater risk of the forwarder tipping over, particularly as the forwarder travels up steep slopes over mountainous terrain. This makes it challenging to design a high-capacity forwarder that is both nimble and safe to operate.

SUMMARY

According to various aspects, this disclosure relates to a tracked vehicle. The tracked vehicle comprises a body extending in a longitudinal direction of the tracked vehicle, the body having a front end and a rear end defining a length of the body. The tracked vehicle comprises first and second track systems mounted on respective lateral sides of the body, each track system comprising a front end and a rear end defining a length of the track system.

Each track system comprises a track that comprises a ground-engaging outer surface and an inner surface opposite the ground-engaging outer surface, the track comprising a top run and a bottom run, the ground-engaging outer surface of the bottom run defining an area of contact configured to engage the ground during use, and a track-engaging assembly configured to drive and guide the track around the track-engaging assembly, the track-engaging assembly comprising a plurality of track-contacting wheels and a frame supporting respective ones of the track-contacting wheels.

The tracked vehicle also comprises an operator cabin mounted to the body, the operator cabin comprising an operator interface for allowing an operator of the tracked vehicle to enter operator commands to operate the tracked vehicle. The tracked vehicle comprises a powertrain mounted to a portion of the body and comprising a prime mover.

The tracked vehicle is configured to provide an improved loading capacity and/or to facilitate operation of the tracked vehicle by the operator from the operator cabin. This can be achieved in various ways by design of the body.

For example, according to a first broad aspect, the body is designed to comprise a front overhang portion and a rear overhang portion. A ratio of the length of the vehicle to the length of each track system is between 1.25 and 1.75; an entirety of the front overhang portion is above a second plane passing through a frontmost point of the bottom run of the track and defining an angle between 15° and 30° with a first plane defined by an area of contact of the track with flat ground. Also, an entirety of the rear overhang portion is above a third plane passing through a rearmost point of the bottom run of the track and defining an angle between 15° and 35° with the first plane.

As another example, according to another broad aspect, the body is designed so that a ratio of the length of the body over the length of the track systems is at least 1.25. A mass center of the tracked vehicle is located in a front quarter of a length of the tracked vehicle in the longitudinal direction of the tracked vehicle when the tracked vehicle is unloaded.

As another example, according to another broad aspect, the body is configured to comprise a front overhang portion having a length of at least 0.7 m. An entirety of the body is above a second plane crossing a point at a front end of the bottom run of the track and defining an angle of at least 12° with a first plane defined by the bottom run of the track.

As another example, according to another broad aspect, a platform is mounted on the body, the platform comprising a loading surface for receiving a load. A first plane defined by the bottom run of the track and a second plane intersecting the front end of the body and a front end of the bottom run of the track define an angle of attack of the tracked vehicle of at least 12°. The platform is configured to receive a load of at least 7200 kg over a surface area of at least 8 $m^2$.

As another example, according to another broad aspect, a distance between the operator seat and the outer edge of the track of the first track system in a widthwise direction of the tracked vehicle is designed to be between 0.01 m and 0.60 m.

Two or more of the aforementioned aspects may be combined in the same tracked vehicle.

These and other aspects of this disclosure will now become apparent to those of ordinary skill in the art upon review of the following description of embodiments in conjunction with the accompanying drawings.

BRIEF DESCRIPTION OF THE DRAWINGS

A detailed description of embodiments is provided below, by way of example only, with reference to the accompanying drawings, in which.

Figure 1:
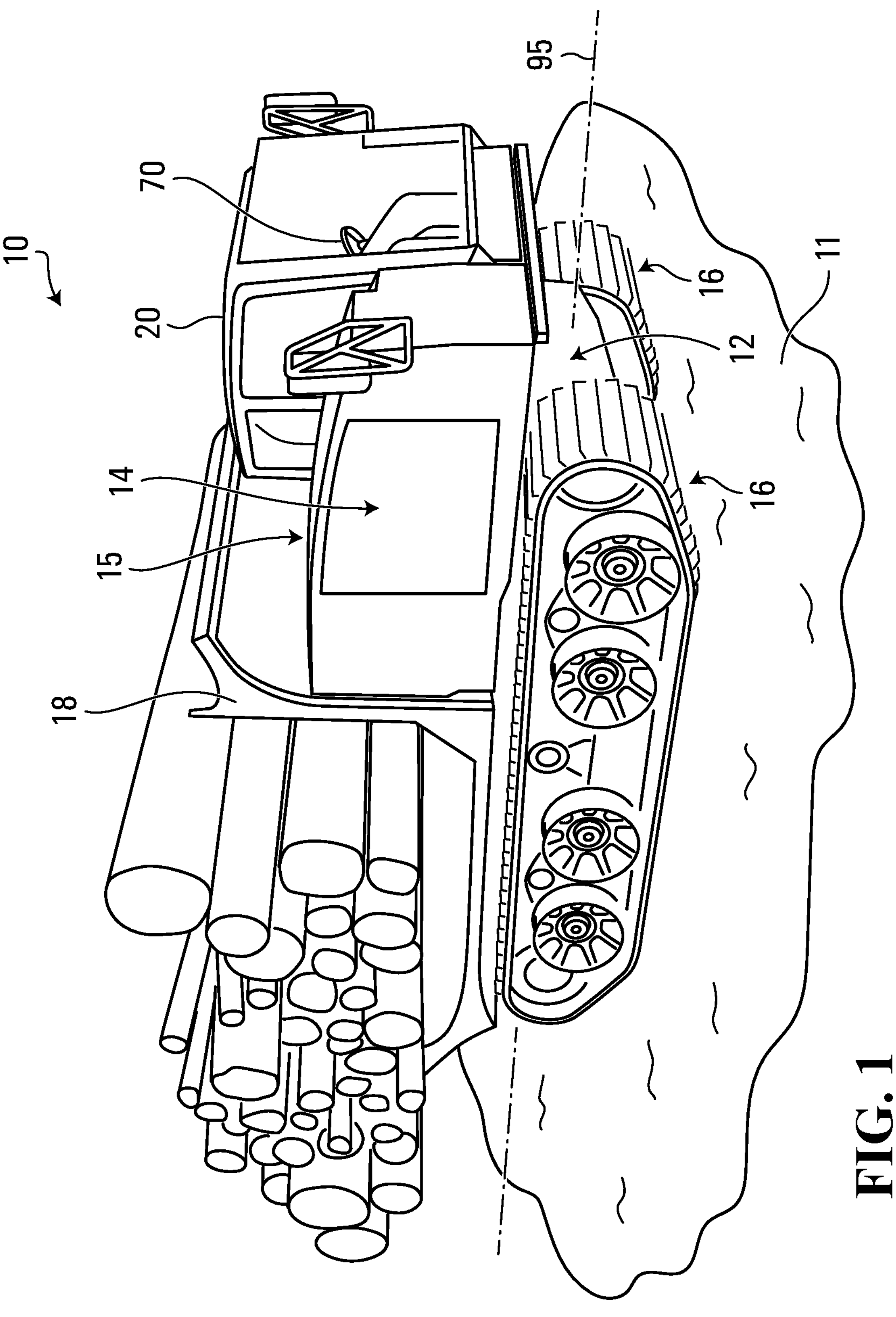
FIG. 1 is a front perspective view of a tracked vehicle in accordance with a non-limiting embodiment, the tracked vehicle carrying a load.
Figure 2:
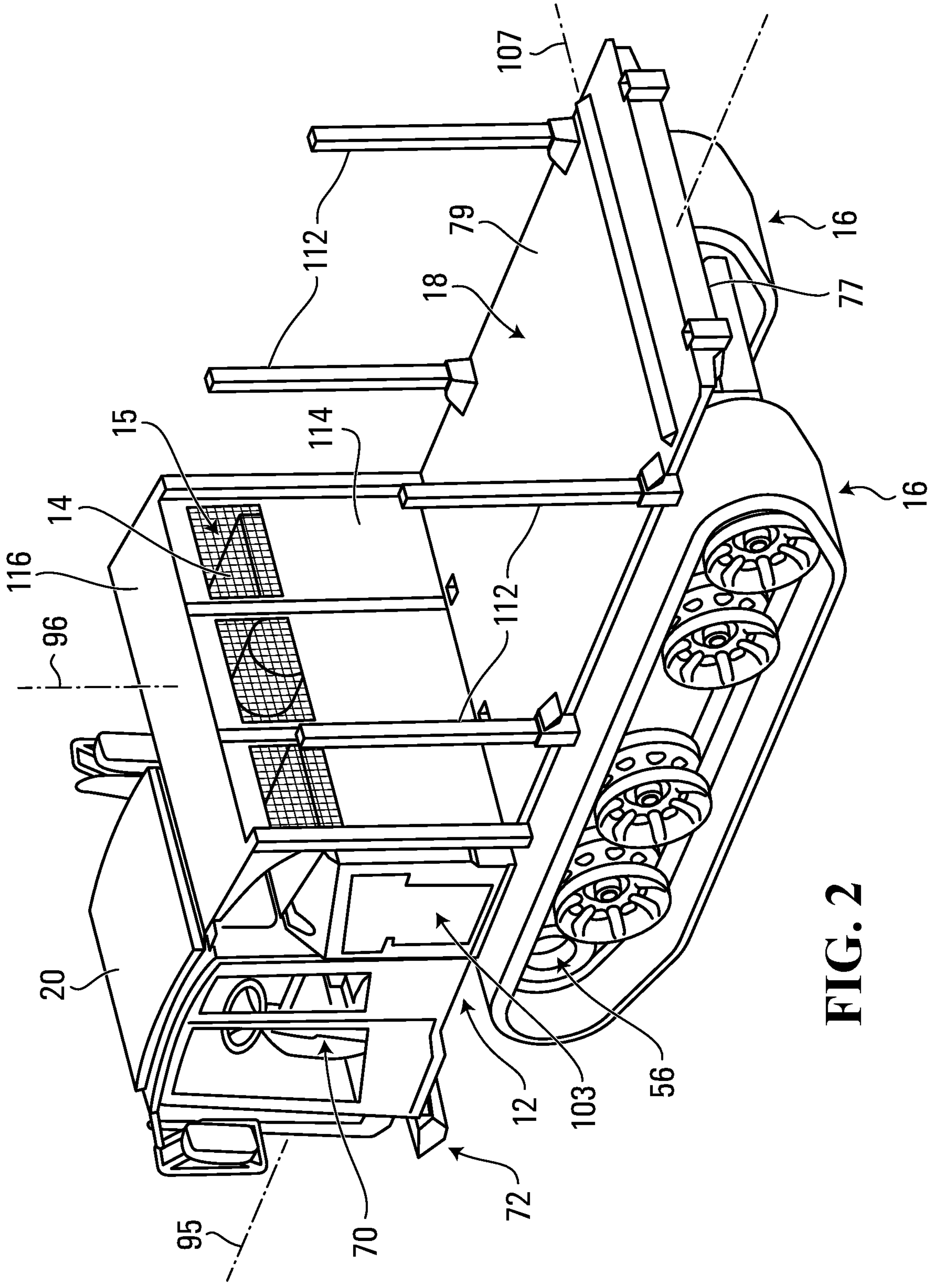
FIGS. 2 to 5 are a rear perspective view, a front elevation view, a left side elevation view, and a plan view, respectively, of the tracked vehicle.
Figure 3:
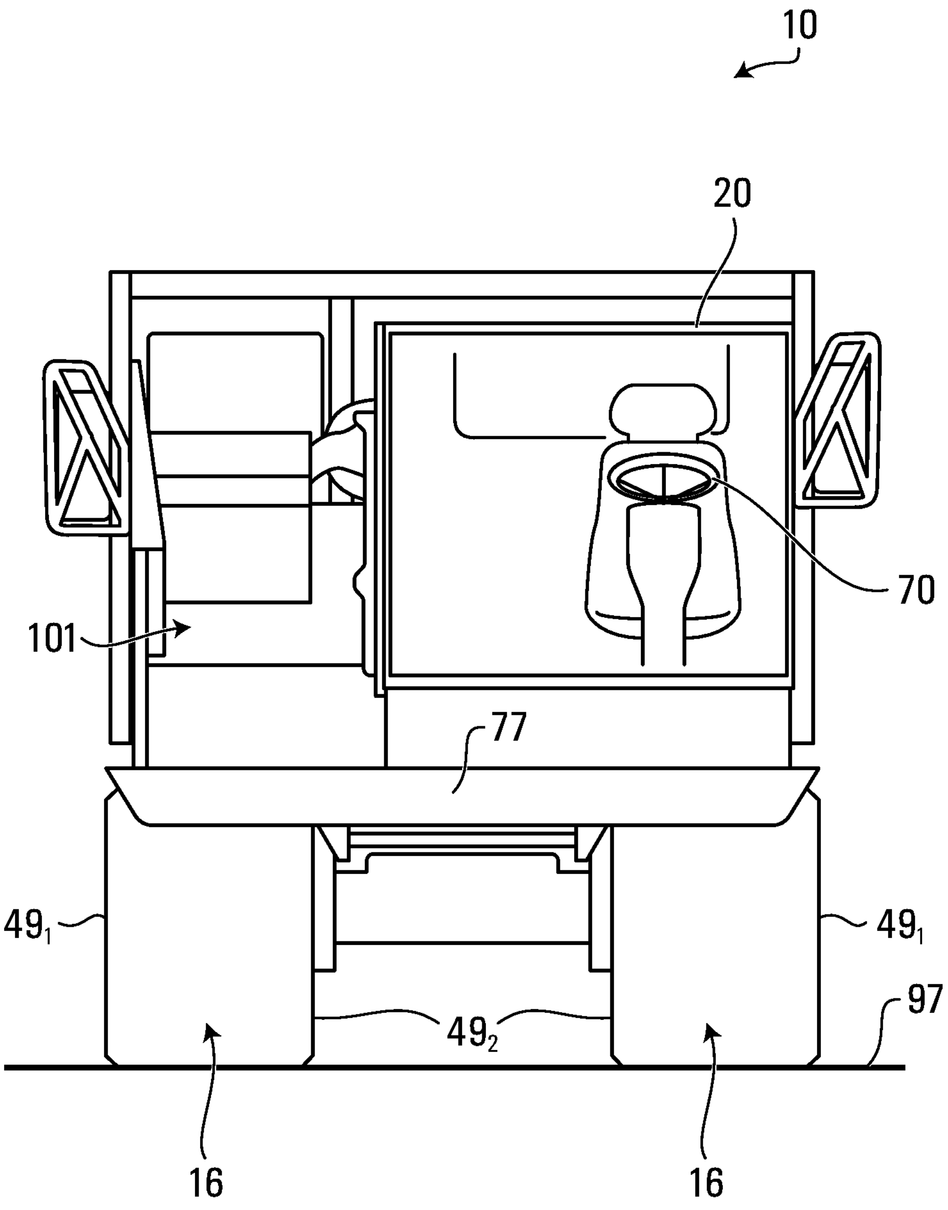

It is to be expressly understood that the description and drawings are only for purposes of illustrating certain embodiments and are an aid for understanding. They are not intended to and should not be limiting.

DETAILED DESCRIPTION OF EMBODIMENTS

FIGS. 1 to 5 show an embodiment of a vehicle 10 comprising two track systems 16 including respective tracks 22 for traction of the vehicle 10 on a surface 11 (i.e., the ground). In this embodiment, the vehicle 10 is a forwarder, which may be used for carrying logs. The tracks 22 help distribute the weight of the vehicle over a greater contact area, thus lowering the vehicle's ground pressure, which is particularly impactful when heavy loads are carried.

The vehicle 10 comprises a body 12, a powertrain 15, the aforementioned track systems 16 (which can be referred to collectively as part of the vehicle's "undercarriage"), and an operator cabin 20 from which an operator controls operation of the vehicle 10, including its movement on the surface 11. The surface 11 can include a road but may also include rough terrain, consisting of vegetation, hills, bumps and troughs. As further discussed later, the vehicle 10 is configured to provide a considerable load capacity while being able to safely operate and travel on such terrain.

The body 12 (which may be referred to as a chassis) is a structural member of the vehicle 10 and extends in a longitudinal direction 95 of the vehicle 10. The chassis 12 has a front end portion 62 and a rear end portion 64 together defining a length of the chassis 12. More specifically, in this embodiment, the front end portion 62 comprises a frontmost point 87 of the chassis 12 and the rear end portion 64 comprises a rearmost point 89 of the chassis 12. In this embodiment, the length of the chassis 12 represents a significant portion of a length $L_V$ of the vehicle 10. In some embodiments, the length of the chassis 12 represents at least 80% of the length $L_V$ of the vehicle 10, with the balance being of the length $L_V$ of the vehicle 10 being taken up by a platform 18 (to be described herein below). However, in other embodiments, the length of the chassis 12 may represent at least 90%, or at least 95% or even an entirety of the length $L_V$ of the vehicle 10, i.e., the chassis 12 may itself define the length $L_V$ of the vehicle 10, the frontmost point 87 of the chassis is a frontmost point of the vehicle 10, and the rearmost point 87 of the chassis 12 is a rearmost point of the vehicle 10.

The chassis 12 comprises a bottom surface 77. More specifically, in this example, the bottom surface 77 of the chassis 12 is defined as following the contour of the chassis 12 and defines an elevation $E_C$ of the chassis 12 over the ground along the perimeter of the chassis 12.

In this embodiment, the vehicle 10 comprises a work implement mounted on the chassis 12. For instance, in this embodiment, the work implement is a platform 18 for receiving logs and/or forestry equipment. In other embodiments, the vehicle 10 may include other structures (e.g., a bin) and/or other types of work implement.

In this embodiment, the platform 18 comprises a bottom surface 91 configured for facing the ground and an upper surface 79 configured for receiving and supporting logs and/or forestry equipment. The surface 79 may define an elevation $E_P$ of the platform 18, i.e., a distance in a height-wise direction of the vehicle 10 between the surface 79 and the ground when the vehicle 10 is on flat ground.

The platform 18 may be mounted to the chassis 12 by any suitable means. In this embodiment, the vehicle 10 comprises a pivot 105 rotatably connecting the platform 18 to the chassis 12. More specifically, in this embodiment, the pivot 105 connects the rear end portion 64 of the chassis 12 to a rear end portion of the platform 18, and the pivot 105 defines a pivot axis 107 that is located behind the track system 16 in the longitudinal direction of the vehicle 10. A portion of the platform 18 may also be configured to engage and rest on the chassis 12, such that the chassis 12 supports the platform 18.

The platform 18 may be rotatable relative to the chassis 12 about the pivot axis, which may be extending in the width-wise direction of the vehicle 10. In this embodiment, the vehicle 10 comprises a motor 68 for rotating the platform 18 relative to the chassis 12. The vehicle 10 may comprise additional components to operate the platform 18 (such as, for example, a suspension system, one or more hydraulic cylinders, a locking mechanism, etc.).

The vehicle 10 may also comprise other structural elements for supporting the logs and/or forestry equipment. For instance, in this embodiment, the vehicle 10 comprises one or more posts 112 mounted around a perimeter of the platform 18 and configured to hold the logs and/or forestry equipment in place. For instance, in this embodiment, the vehicle 10 may comprise at least 1, at least 2, at least 3, or more posts 112 mounted on each lateral side of the platform 18. In some embodiments, the vehicle 10 may also comprise one or more walls 114 mounted around at least part of the perimeter of the platform 18 and configured to hold the logs and/or forestry equipment in place. The posts 112 and the walls 114 may be mounted "vertically". That is, the posts 112 and the walls 114 may extend in the height-wise direction of the vehicle 10. The posts 112 and the walls 114 may be mounted to the platform 18 in any suitable way, including by fastening, by welding, etc. In some embodiments, the posts 112 and the walls 114 may be removably mounted to the platform 18, and in other embodiments, the posts 112 and the walls 114 may be permanently mounted to the platform. The posts 112 and the walls 114 may have any suitable length. For instance, in some embodiments, each post or wall may have a length of at least 1 meter, in some embodiments at least 1.5 meters, in some embodiments at least 2 meters, and in some embodiments even more.

In the illustrated embodiment, the vehicle 10 comprises a protecting wall 116 extending at least partly over the powertrain 15 and/or the operator cabin 20 of the vehicle 10 to prevent objects (such as logs carried on the platform 18) from falling on and damaging the powertrain 15 or the operator cabin. For example, the protecting wall 116 may extend from a top portion of a front one of the walls 114. However, the protecting wall 116 is not required in all embodiments.

The platform 18, the posts 112 and the walls 114 may define a volumetric capacity of the vehicle 10. More specifically, a surface area of the platform 18 multiplied by the length of the posts 112 and the walls 114 may define the volumetric capacity of the vehicle 10. In this embodiment, the vehicle 10 may be configured to have a considerable volumetric capacity relative to the size of the vehicle 10. The volumetric capacity of the vehicle 10 may be greater than a volumetric capacity of prior art vehicles of comparable size. For instance, in some embodiments the volumetric capacity may be at least 10 $m^3$, in some embodiments at least 12 $m^3$, in some embodiments at least 14 $m^3$, and in some embodiments even more (e.g., at least 16 $m^3$). To give an illustration of the relative volumetric capacity of the vehicle 10 to its size, in some embodiments, a ratio of the volumetric capacity to the length $L_{TS}$ of the track system 16 may be at least 2.2 $m^2$, in some embodiments at least 2.6 $m^2$, in some embodiments at least 3 $m^2$, and in some embodiments even more (e.g., at least 3.2 $m^2$).

In the illustrated embodiment, the vehicle 10 comprises a front overhang portion 72 longitudinally in front of the track systems 16 and a rear overhang portion 74 longitudinally rearwards of the track systems 16. The front overhang portion 72 of the vehicle 10 is longitudinally in front of a frontmost roller wheel 28 of the track system 16. In this embodiment, the front overhang portion 72 of the vehicle 10 may span part of the chassis 12, at least part of the operator cabin 20, and at least part of the powertrain 15. The rear overhang portion 74 of the vehicle 10 is longitudinally rearwards from the rearmost roller wheel 28 of the track system 16. In this embodiment, the rear overhang portion 74 of the vehicle 10 may span part of the chassis 12, and part of the platform 18. Since the vehicle 10 is supported by the track systems 16, in this embodiment, the portion towards the front of the vehicle 10 in front of a connection between the track systems 16 and the chassis 12 is the front overhang portion 72 and the portion towards the rear of the vehicle 10 rearward to the connection between the track systems 16 and the chassis 12 is the rear overhang portion 74. A majority (in the length-wise direction) of each of the front overhang portion 72 and the rear overhang portion 74 is configured to project over the ground and to be clear of the track systems 16 underneath when the vehicle 10 is in use.

In some embodiments, the platform 18 is configured to receive a payload of at least 6000 kg (e.g., between 6000 kg and 9000 kg), in other embodiments at least 6600 kg (e.g., between 6600 kg and 8000 kg), in further embodiments at least 7200 kg (e.g., about 7200 kg), and in other embodiments even more. The platform 18 may have a geometry suitable for receiving such payload. For instance, in some embodiments, a thickness of the platform 18 may be between 0.10 m and 0.30 m, and more specifically about 0.20 m. To this end, also, the platform 18 may comprise or be made of any suitable material. For instance, in some embodiments, the platform 18 comprises a metallic material, such as steel, aluminum, and so on. In some embodiments, depending on operational requirements, the platform may comprise a polymeric material such as a plastic, a composite material, etc.

The powertrain 15 is mounted to a portion of the chassis 12 and is configured for generating motive power and transmitting motive power to the track systems 16 to propel the vehicle 10 on the ground. More specifically, in this embodiment, the powertrain 15 is mounted to the lower structure 76 of the chassis 12. To that end, the powertrain 15 comprises a prime mover 14, which is a source of motive power that comprises one or more motors. For example, in this embodiment, the prime mover 14 comprises an internal combustion engine. In other embodiments, the prime mover 14 may comprise another type of motor (e.g., an electric motor) or a combination of different types of motor (e.g., an internal combustion engine and an electric motor). The prime mover 14 is in a driving relationship with the track systems 16. That is, the powertrain 15 transmits motive power generated by the prime mover 14 to one or more of the track systems 16 in order to drive (i.e., impart motion to) these one or more of the track systems 16. The powertrain 15 may transmit power from the prime mover 14 to the track systems 16 in any suitable way. In this embodiment, the powertrain 15 comprises a transmission (not shown) between the prime mover 14 and a pair of final drive axles 56 (one for each of the track systems 16) for transmitting motive power from the prime mover 14 to the track systems 16. The transmission may be an automatic transmission (e.g., a continuously variable transmission (CVT)) or any other suitable type of transmission.

In the illustrated embodiment, at a least part 101 of (i.e., part of, a majority of, or an entirety of) the powertrain 15 is mounted adjacent the operator cabin 20 in a widthwise direction of the vehicle 10. In this embodiment, at least a part 103 of the powertrain 15 is mounted adjacent the operator cabin 20 in the longitudinal direction of the vehicle 10.

Figure 6:
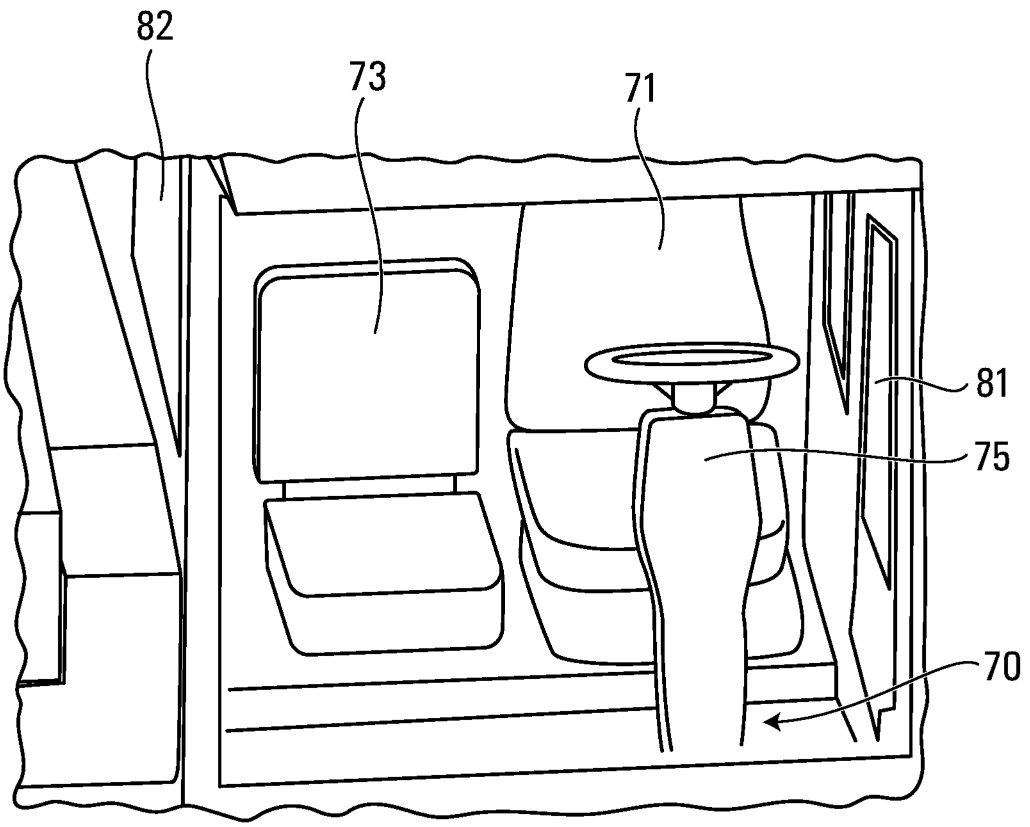
FIG. 6 is a plan view of an operator cabin of the tracked vehicle.
Figure 7:
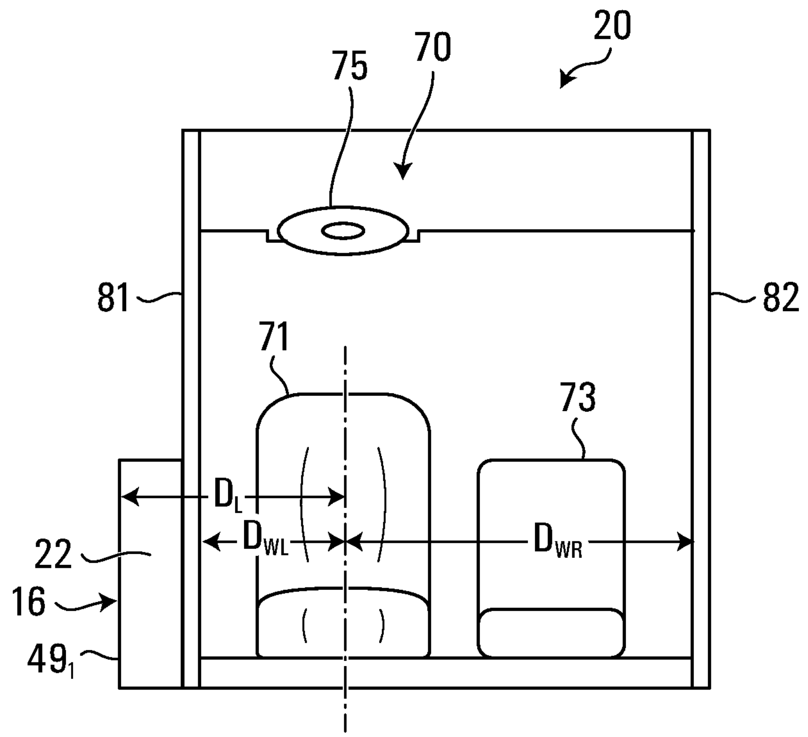
FIG. 7 is a schematic plan view of a front portion of the tracked vehicle.

As shown in FIGS. 6 and 7, the operator cabin 20 is where the operator sits and controls the vehicle 10. More particularly, the operator cabin 20 is mounted on a portion of the chassis 12 on a given lateral side of the chassis 20 (e.g., the left side when driving). In this embodiment, at least part of the powertrain 15 is mounted adjacent the operator cabin 20 in the widthwise direction of the vehicle 10 on the other lateral side (e.g., the right side) of the vehicle 10. The operator cabin 20 comprises a first lateral window 81 towards the left lateral side of the chassis 12 and a second lateral window 82 towards the right lateral side of the chassis 12. The operator cabin 20 comprises an operator seat 71 facing a user interface 70 which includes a set of controls that allow the operator to enter operator commands to operate the vehicle 10 (e.g., to steer the vehicle 10 on the ground and operate the work implement, if any) when sitting on the seat 72. For example, in this embodiment, the user interface 70 comprises an accelerator, a brake control, and a steering device 75 that are operable by the operator to control motion of the vehicle 10 on the ground. The user interface 70 also comprises an instrument panel (e.g., a dashboard) which provides indicators (e.g., a speedometer indicator, a tachometer indicator, etc.) to convey information to the operator.

The track systems 16 engage the ground to propel the vehicle 10. In this embodiment, the track systems 16 comprise a first track system 16 mounted on the right side of the chassis 12 and a second track system 16 mounted on the left side of the chassis 12.

Figure 8:
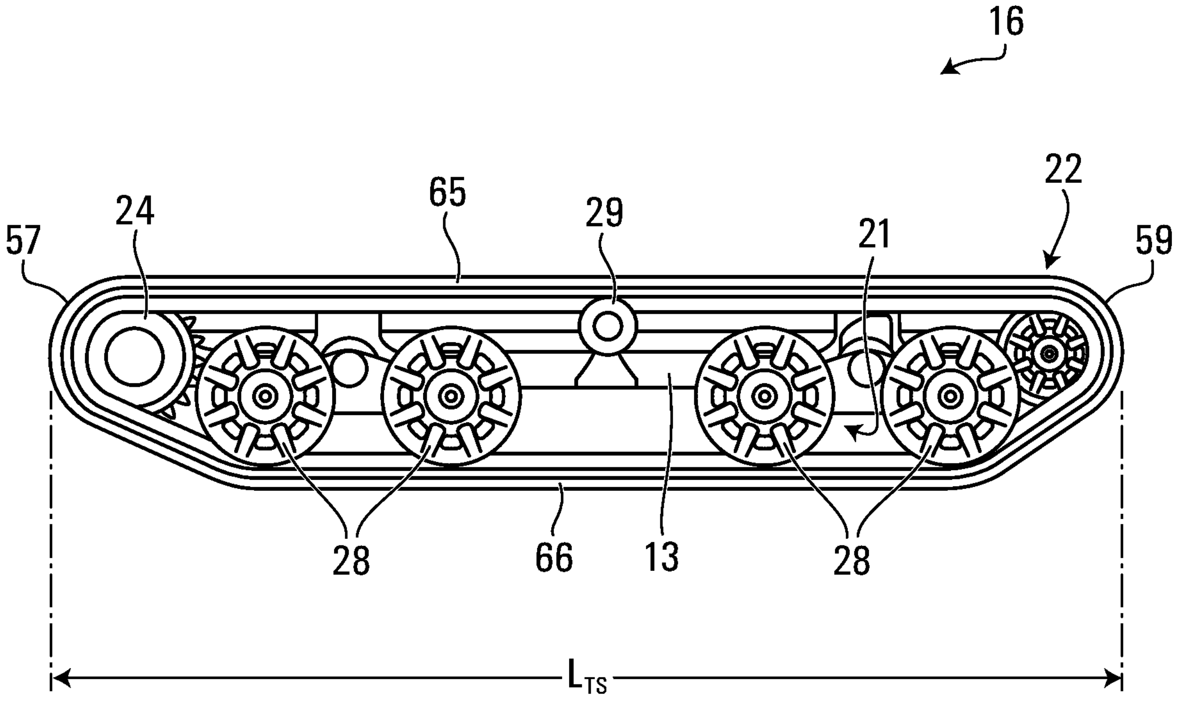
FIG. 8 is a side elevational view of a track system of the tracked vehicle.

As shown in FIG. 8, each track system 16 comprises a track-engaging assembly 21 and a track 22 disposed around the track-engaging assembly 21. The track 22 engages the ground to provide traction to the vehicle 10. In this embodiment, the track-engaging assembly 21 comprises a plurality of track-contacting wheels and a frame 13 which supports various components of the track system 16, including the track-contacting wheels. In this embodiment, the track-contacting wheels include a drive wheel 24 at a first longitudinal end portion of the track system 16, and a plurality of idler wheels that includes an idler wheel 26 at a second longitudinal end portion of the track system 16 opposite to the first longitudinal end portion in the longitudinal direction of the track system 16. More specifically, in this embodiment, the first longitudinal end portion is a front end portion and the drive wheel 24 is aligned with the powertrain 15 in the longitudinal direction of the vehicle 10, and the second longitudinal portion is a rear end portion and the idler wheel 26 is a rear (trailing) idler wheel. In this embodiment, the track-contacting wheels also include a plurality of roller wheels 28 supporting at least a portion of (i.e., a portion of, a majority of, or an entirety of) the weight of the vehicle 10, and, in some embodiments, one or more support wheels 29 for supporting a portion of the track 22.

Each track system 16 has a first longitudinal end 57 and a second longitudinal end 59 that define a length $L_{TS}$ of the track system 16 along a longitudinal axis 61 that defines a longitudinal direction of the track system 16. The track system 16 has a widthwise direction and a width that is defined by a width W of the track 22. The track system 16 also has a heightwise direction that is normal to its longitudinal direction and its widthwise direction.

The vehicle 10 is steerable by a steering system that is responsive to input of the user at the steering device 75, so as to change an orientation of the vehicle 10 about a steering axis 96 of the vehicle 10. An orientation of the longitudinal axis 61 of each of the track systems 16 is thus adjustable relative to a longitudinal axis 95 of the vehicle 10. Steering may be achieved by controlling the track systems 16 so that one track moves faster than the other. The differing amount of traction applied to each side of the vehicle 10 results in a controllable change in orientation of the longitudinal axis 95 of the vehicle 10.

Figure 9:
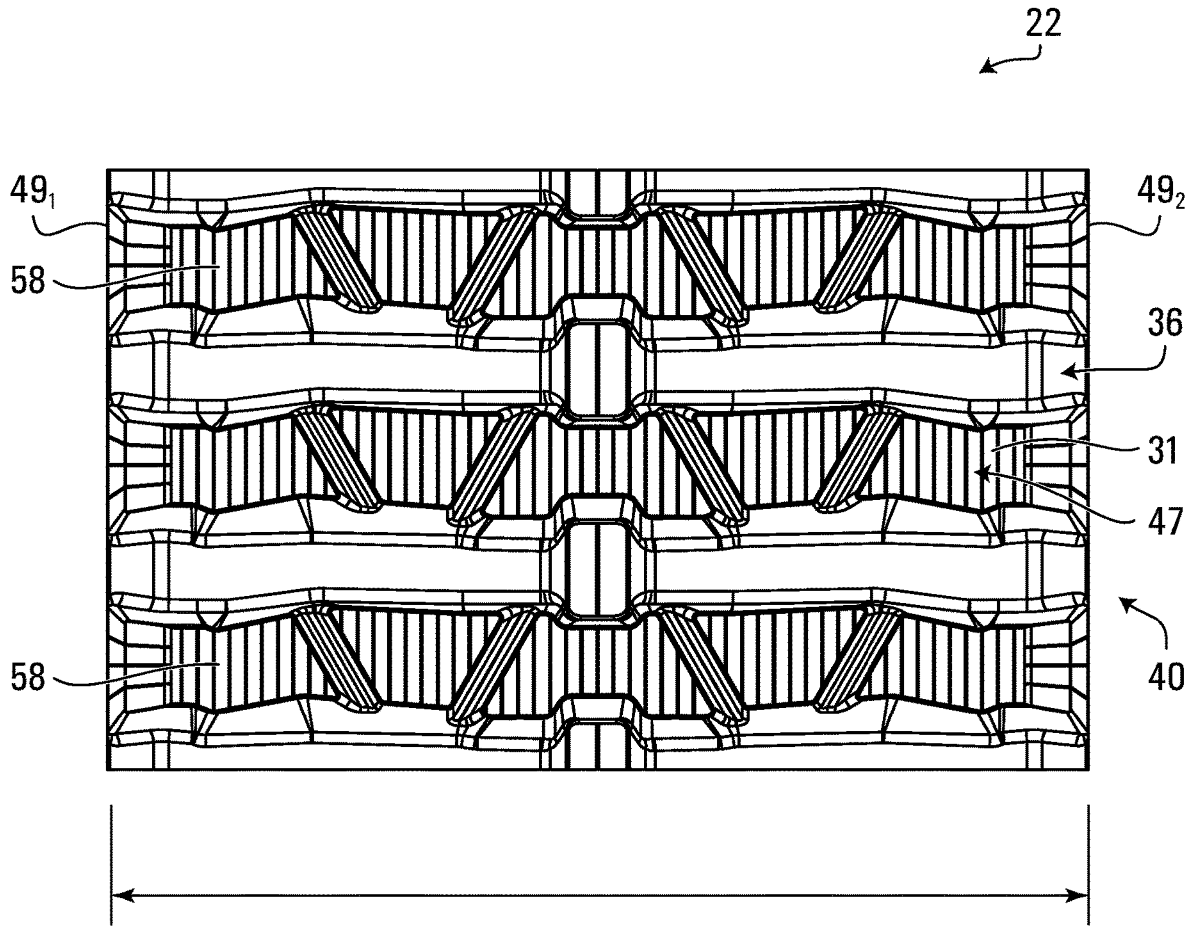
FIGS. 9 to 11 show a track of the track system of FIG. 8 in greater detail.

The track 22 has a suitable length for facilitating mounting around the track-engaging assembly 21. In view of its closed configuration without ends that allows it to be disposed and moved around the track-engaging assembly 21, the track 22 can be referred to as an "endless" track. With additional reference to FIGS. 9 to 11, the track 22 comprises an inner side 45, a ground-engaging outer side 47, and lateral edges 491, 492. The inner side 45 faces the wheels 24, 26, 28, 29, while the ground-engaging outer side 47 engages the ground.

A top run 65 of the track 22 extends between the longitudinal ends 57, 59 of the track system 16 and over the wheels 24, 26, 28, 29, while a bottom run 66 of the track 22 extends between the longitudinal ends 57, 59 of the track system 16 and under the wheels 24, 26, 28, 29. The bottom run 66 of the track 22 defines an area of contact of the track 22 with the ground which generates traction and bears a majority of a load on the track system 16, and which can be referred to as a "contact patch" of the track 22 with the ground.

It should be appreciated that the top run 65 and the bottom run 66 refer to fixed portions of the track 22 when the track 22 is not moving. However, when the track 22 is moving, the top run 65 and the bottom run 66 are defined at a moment in time, the top run 65 being the portion of the track that happens to extend between the longitudinal ends 57, 59 of the track system 16 and over the wheels 24, 26, 28, 29 at that moment in time, and the bottom run 66 of the track 22 being the portion of the track 22 that happens to extend between the longitudinal ends 57, 59 of the track system 16 and under the wheels 24, 26, 28, 29 at that moment in time.

The track 22 has a longitudinal axis 19 which defines a longitudinal direction of the track 22 (i.e., a direction generally parallel to its longitudinal axis) and transversal directions of the track 22 (i.e., directions transverse to its longitudinal axis), including a widthwise direction of the track 22 (i.e., a lateral direction generally perpendicular to its longitudinal axis).

In this embodiment, the track 22 is relatively wide to efficiently distribute load of the vehicle 10 over the surface of the terrain 11. For instance, in some embodiments, the width $W_T$ of the track 22 may be at least 24 inches, in some cases at least 36 inches, in some cases at least 48 inches, in some cases even more.

In some cases, the track 22 may be an elastomeric track, and as such comprises elastomeric material, so as to be flexible around the track-engaging assembly 21. The elastomeric material of the track 22 can include any polymeric material with suitable elasticity. In this embodiment, the elastomeric material of the track 22 includes rubber. Various rubber compounds may be used, and, in some cases, different rubber compounds may be present in different areas of the track 22. In other embodiments, the elastomeric material of the track 22 may include another elastomer in addition to or instead of rubber (e.g., polyurethane elastomer). In an embodiment, the track 22 is a metal embedded rubber track (MERT).

Structurally, the track 22 comprises an endless body 36 underlying its inner side 45 and ground-engaging outer side 47. In view of its underlying nature, the body 36 will be referred to as a "carcass". In this embodiment, the carcass 36 comprises a base 90. The carcass 36 and the base 90 thereof are elastomeric in that the base 90 comprises elastomeric material 38 which allows the carcass 36 to elastically change in shape and thus the track 22 to flex as it is in motion around the track-engaging assembly 21. In some embodiments, the carcass 36 comprises a plurality of reinforcements, such as reinforcements embedded in its elastomeric material 38 and spaced from one another. These reinforcements can take on various forms, such as reinforcing layers. For example, in this embodiment, the base 90 of the carcass 36 may comprise a layer of reinforcing cables (e.g., cords including a plurality of strands (e.g., textile fibers or metallic wires), other types of cable, etc., which may be made of any material suitably flexible along the cable's longitudinal axis (e.g., fibers or wires of metal, plastic or composite material)) that are adjacent to one another and extend generally in the longitudinal direction of the track 22 to enhance strength in tension of the track 22 along its longitudinal direction. As another example, in this embodiment, the base 90 of the carcass 36 may comprises a layer of reinforcing fabric comprising thin pliable material made usually by weaving, felting, knitting, interlacing, or otherwise crossing natural or synthetic elongated fabric elements (e.g., nylon fibers or other synthetic fibers), such as fibers, filaments, strands and/or others, such that some elongated fabric elements extend transversally to the longitudinal direction of the track 22 to have a reinforcing effect in a transversal direction of the track 22.

The carcass 36 may be molded into shape in a molding process during which the rubber 38 is cured. For example, in this embodiment, a mold may be used to consolidate layers of rubber providing the rubber 38 of the carcass 36, the reinforcing cables and the layer of reinforcing fabric.

The inner side 45 of the endless track 22 comprises an inner surface 32 of the carcass 36 and a plurality of wheel-contacting projections 48 that project from the inner surface 32 and are positioned to contact at least some of the wheels 24, 26, 28, 29 to do at least one of driving (i.e., imparting motion to) the track 22 and guiding the track 22. The wheel-contacting projections 48 can be referred to as "wheel-contacting lugs". Furthermore, since each of them is used to do at least one of driving the track 22 and guiding the track 2, the wheel-contacting lugs 48 can be referred to as "drive/guide projections" or "drive/guide lugs". In some examples of implementation, a drive/guide lug 48 may interact with the drive wheel 24 to drive the track 22, in which case the drive/guide lug 48 is a drive lug. In other examples of implementation, a drive/guide lug 48 may interact with the idler wheel 26 and/or the roller wheels 28 to guide the track 22 to maintain proper track alignment and prevent de-tracking without being used to drive the track 22, in which case the drive/guide lug 48 is a guide lug. In this embodiment, a drive/guide lug 48 may both (i) interact with the drive wheel 24 to drive the track and (ii) interact with the idler wheel 26 and/or the roller wheels 28 to guide the track 22 to maintain proper track alignment and prevent de-tracking, in which case the drive/guide lug 48 is both a drive lug and a guide lug.

The ground-engaging outer side 47 of the track 22 comprises a ground-engaging outer surface 31 of the carcass 36 and a tread pattern 40 to enhance traction on the ground. The tread pattern 40 comprises a plurality of traction projections 58 projecting from the ground-engaging outer surface 31, spaced apart in the longitudinal direction of the endless track 22 and engaging the ground to enhance traction. The traction projections 58 may be referred to as "tread projections" or "traction lugs".

In this embodiment, the base 90 of the carcass 36 includes the inner surface 32 of the carcass 36 and part of the ground-engaging outer surface 31 of the carcass 36.

The drive wheel 24 is rotatable by power derived from the prime mover 14 to drive the track 22. That is, power generated by the prime mover 14 and delivered via the powertrain 15 of the vehicle 10 can rotate a final drive axle 56*i*, which causes rotation of the drive wheel 24, which in turn imparts motion to the track 22.

In this embodiment, the drive wheel 24 comprises a sprocket comprising a plurality of drive members (e.g., teeth) spaced apart along a circular path to engage the drive/guide lugs 48 of the track 22 in order to drive the track 22. The drive wheel 24 and the track 22 thus implement a "positive drive" arrangement.

Figure 10:
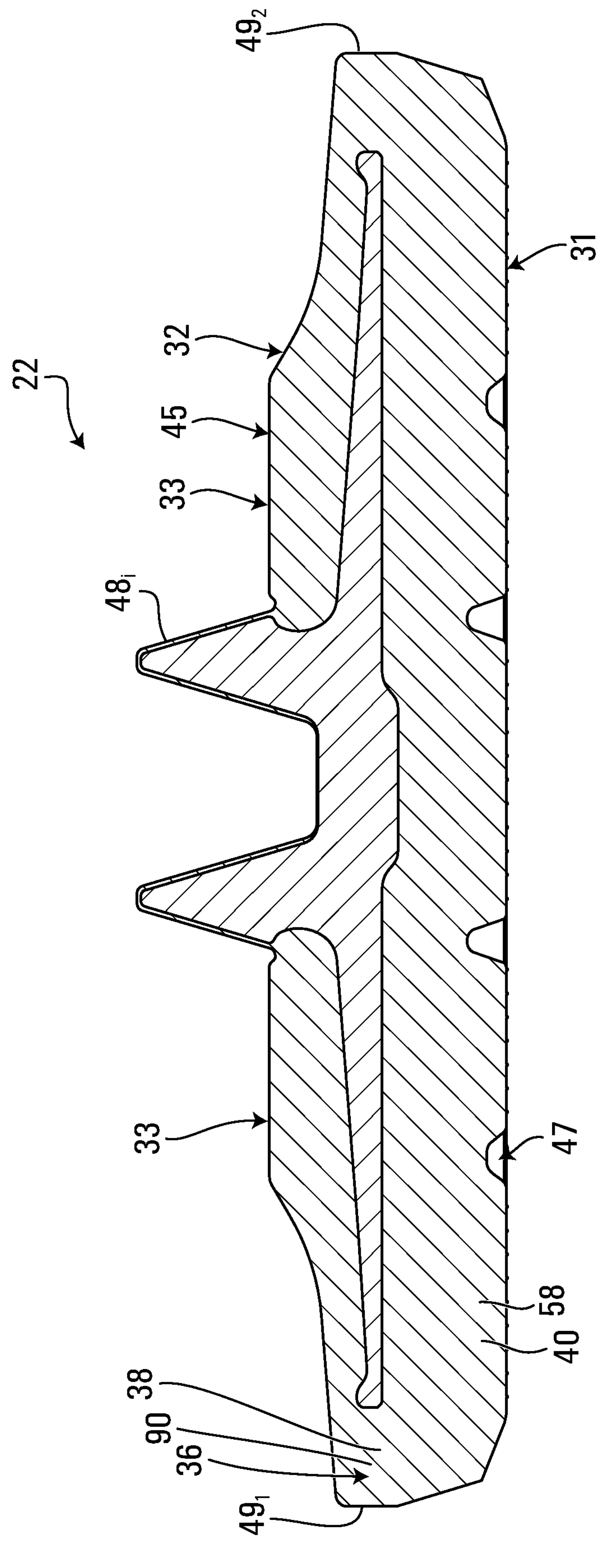
Figure 11:
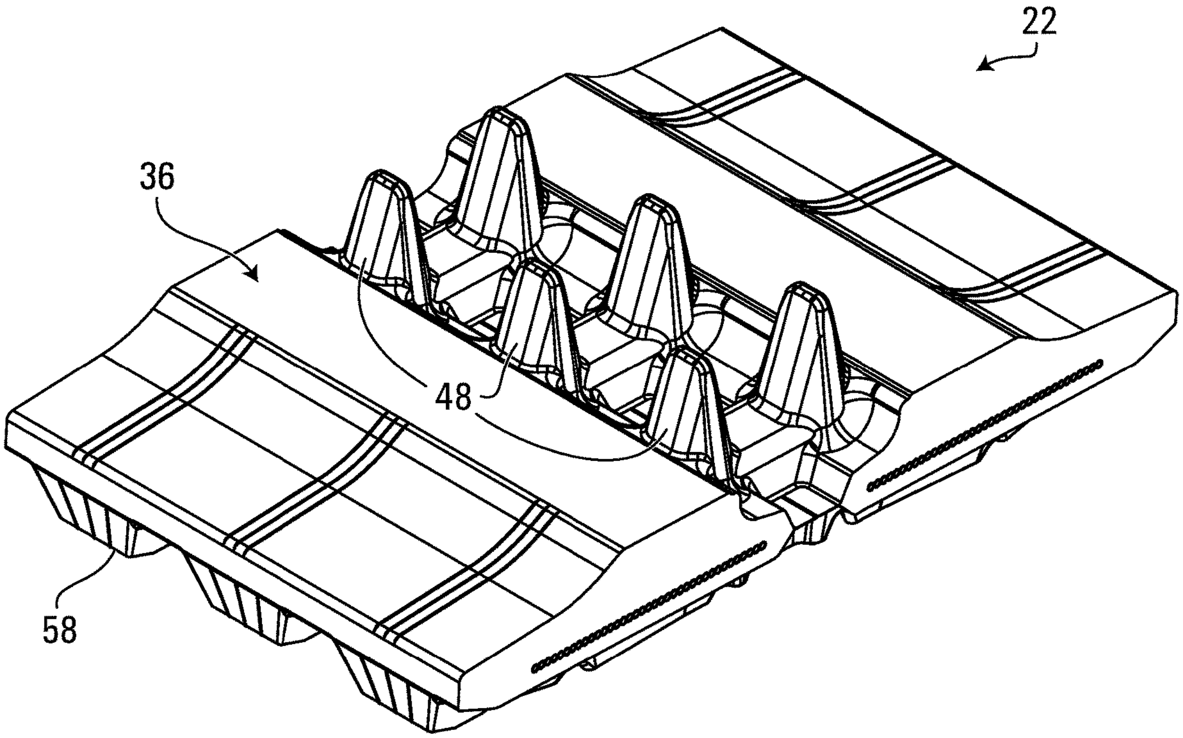
Figure 12:
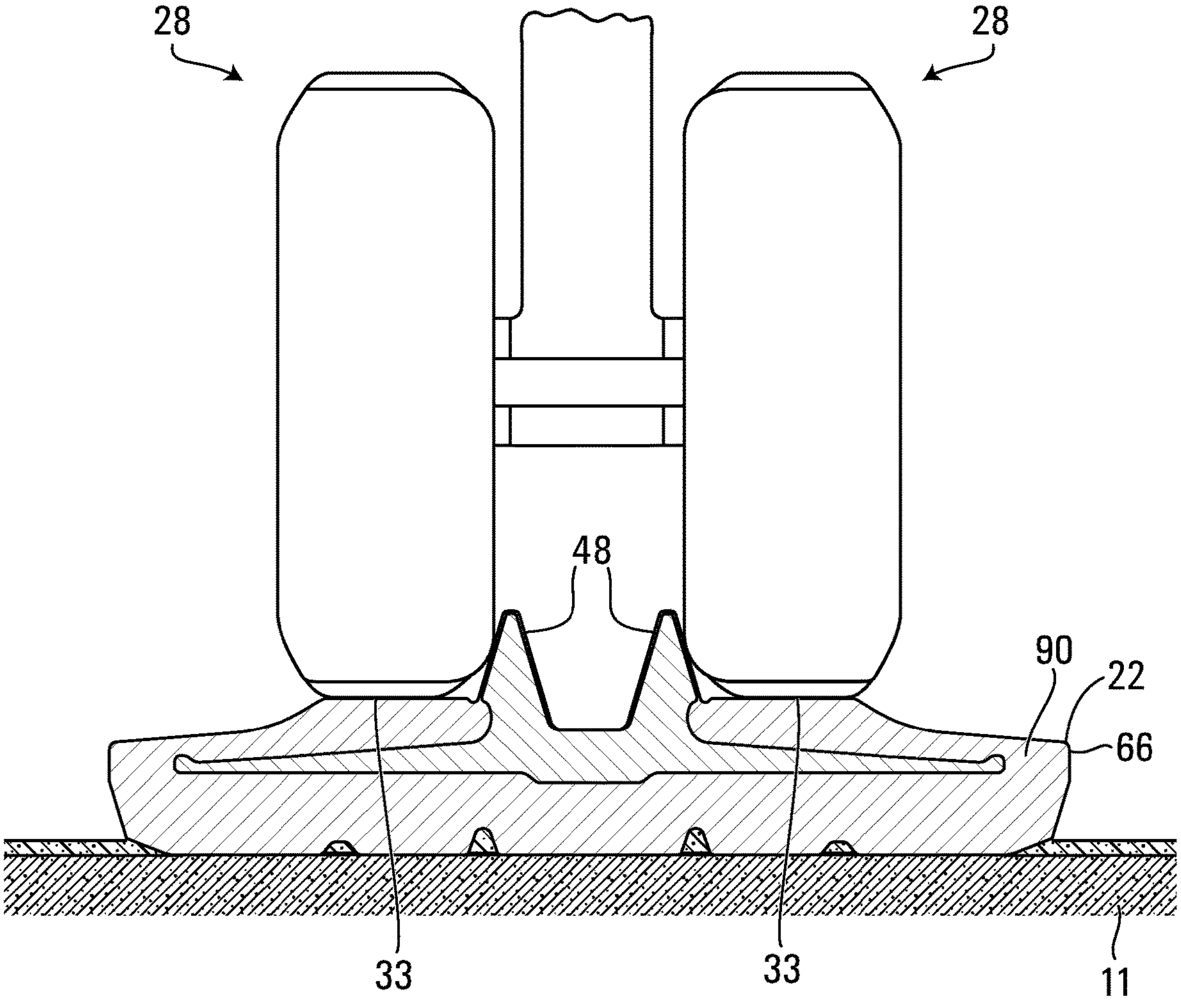
FIG. 12 is an elevational view showing contact between roller wheels of a track-engaging assembly of the track system and the track of the track system, and between the track of the track system and the ground.

The idler wheel 26, roller wheels 28 and support wheel 29 are not driven by power supplied by the prime mover 14, but are rather used for at least one of: supporting part of the weight of the vehicle 10 on the ground via the track 22, guiding the track 22 as it is driven by the drive wheel 24, and tensioning the track 22. More particularly, in this embodiment, the idler wheel 26 is a trailing idler wheel which maintains the track 22 in tension and help to support part of the weight of the vehicle 10 on the ground via the track 22. With reference to FIGS. 8 and 10, the roller wheels 28 roll on a rolling path 33 of the inner side 45 of the track 22 along the bottom run 66 of the track 22 to apply the bottom run 66 on the ground. In this case, as they are located between frontmost and rearmost ones of the wheels of the track system 16, the roller wheels 28 can be referred to as "mid-rollers".

In this embodiment, the vehicle 10 has a relatively large load capacity, which can be enabled by the platform 18 having a relatively large loading surface area. For example, the platform 18 may have a length $L_P$ of between 3 m and 5 m, in some embodiments between 3.5 m and 4.5 m, and in some embodiments of about 4 m. The platform may have a width of between 1.5 m and 3 m, in some embodiments between 2 m and 3.5 m, and in some embodiments of about 2.3 m. As a result, the loading surface area of the platform $A_L$ may range from 4.5 $m^2$ to 15 $m^2$ in some embodiments between 6 $m^2$ and 12 $m^2$, and in some embodiments about 9.2 $m^2$. Other dimensions are also possible.

In all cases, the extensive length $L_P$ of the platform 18 contributes to making the length $L_V$ of the vehicle 10 longer than the length $L_{TS}$ of the track systems 16. This creates at least the rear overhang portion 74 with a length $L_{RO}$. However, it has been discovered that this results in the potential for instability unless certain design constraints are taken into consideration.

Accordingly, it has been discovered that in some non-limiting embodiments, positioning the operator cabin 20 and the powertrain 15 such that at least part of (i.e., part of, a majority of, or an entirety of) the operator cabin 20 is located forward (in the longitudinal direction) of the front longitudinal end 57 of the track system 16 (from a longitudinal point of view) can help render the vehicle 10 stable. This provides the front overhang portion 72 with a length $L_{FO}$ to counterbalance any potential load being placed on the platform 18, particularly in the rear overhang portion 74.

As such, locating the operator cabin 20 at least partly in the front overhang portion 72 may act as a counterweight to preserve the vehicle's balance when the vehicle 10 climbs a slope and the platform 18 is loaded. As a result of this design, whereby the operator cabin 20 and powertrain 15 towards the front of the vehicle 10 (so that a majority of the operator cabin 20 overlies a space that overhangs the track systems 16), a mass center of the vehicle 10 may end up being located in the frontmost quarter (or fifth or sixth) of the length of the vehicle 10, in the longitudinal direction of the vehicle 10 (with the mass being measured when the vehicle 10 is unloaded).

In addition to stability, other constraints may also be associated with the requirement to traverse hilly terrain, which is the need to attack a gradient, either from a flat surface onto an uphill incline or from a downhill incline onto a flat surface. In such cases, a "maximum attack angle" of the vehicle 10 becomes a relevant factor. The maximum attack angles (as there may be more than one) can be defined by the maximum angle of a slope that the vehicle 10 can broach while touching the ground only with the tracks 22 when moving in a certain direction. For instance, the maximum attack angles may comprise a maximum attack angle in the forward direction which may be defined by the maximum angle of a slope that the vehicle 10 can broach while touching the ground only with the tracks 22 when moving in the forward direction, and a maximum attack angle in the rearwards direction which may be defined by the maximum angle of a slope that the vehicle 10 can broach while touching the ground only with the tracks 22 when moving in the rearwards direction.

Figure 4:
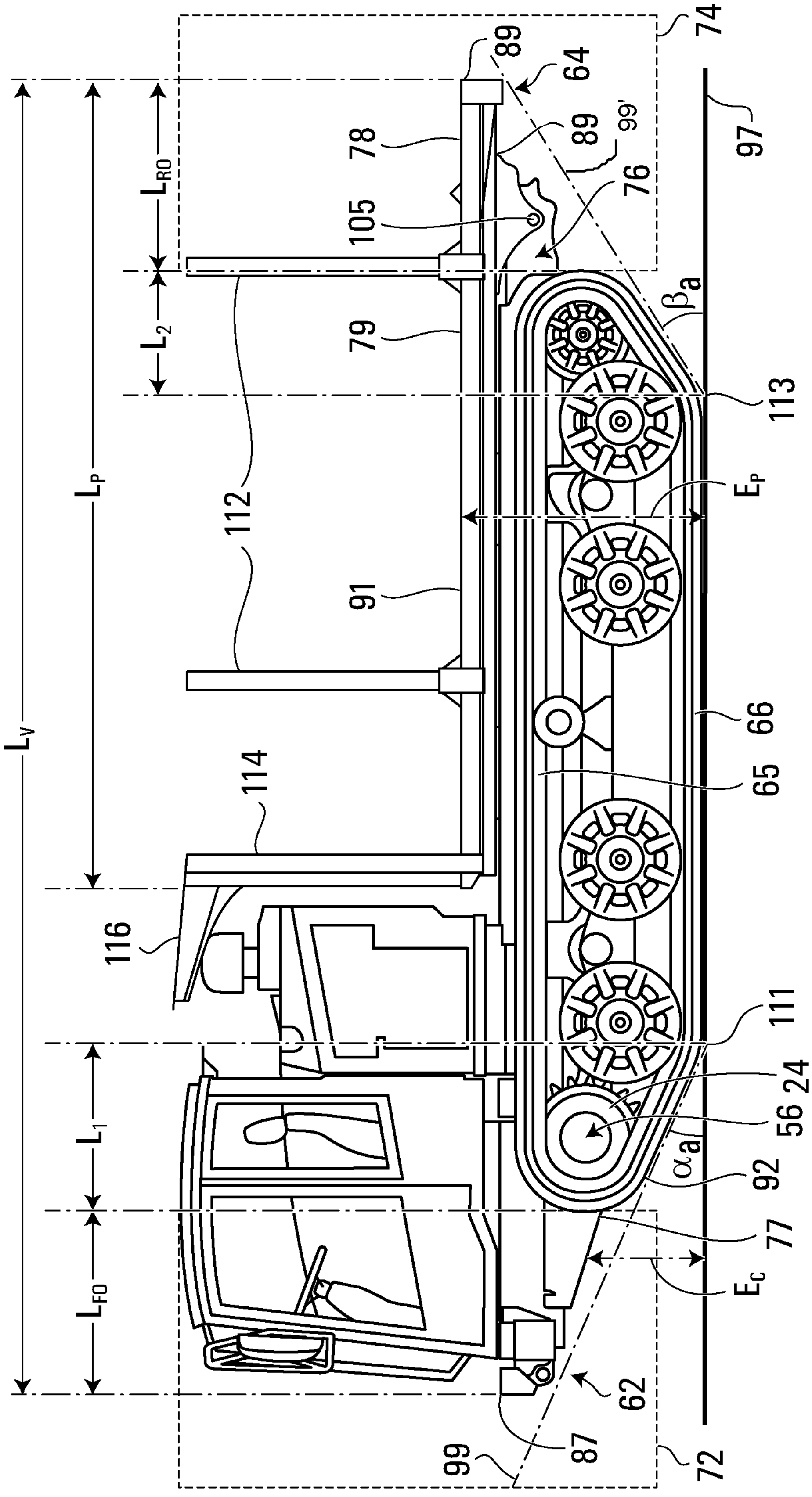
Figure 5:
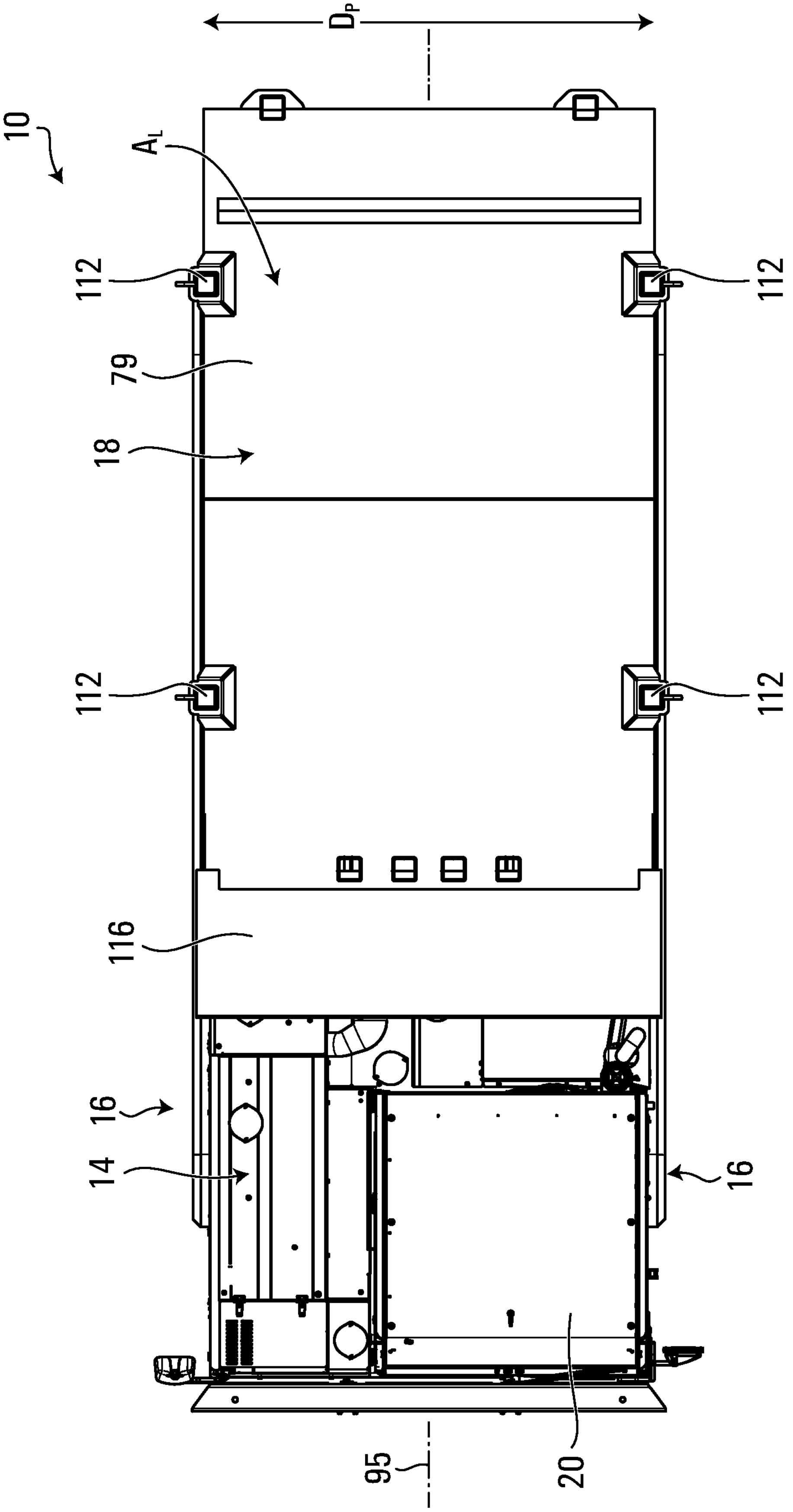

The maximum attack angle for the vehicle 10 in the forward direction may be defined as an angle between two planes 97, 99, as illustrated in FIG. 4. The first plane 97 is a plane defined by the ground-contacting surface of the bottom run 66 of the tracks 22. The second plane 99 is a plane that intersects the first plane at the frontmost limit 111 of the bottom run of each of the tracks 22 (with the vehicle being steered neither to the right nor to the left). The greatest angle of intersection between the first and second planes that still allows the entire vehicle (and, in particular, the front overhang portion 72) to lie above the second plane is the maximum attack angle.

Figure 13:
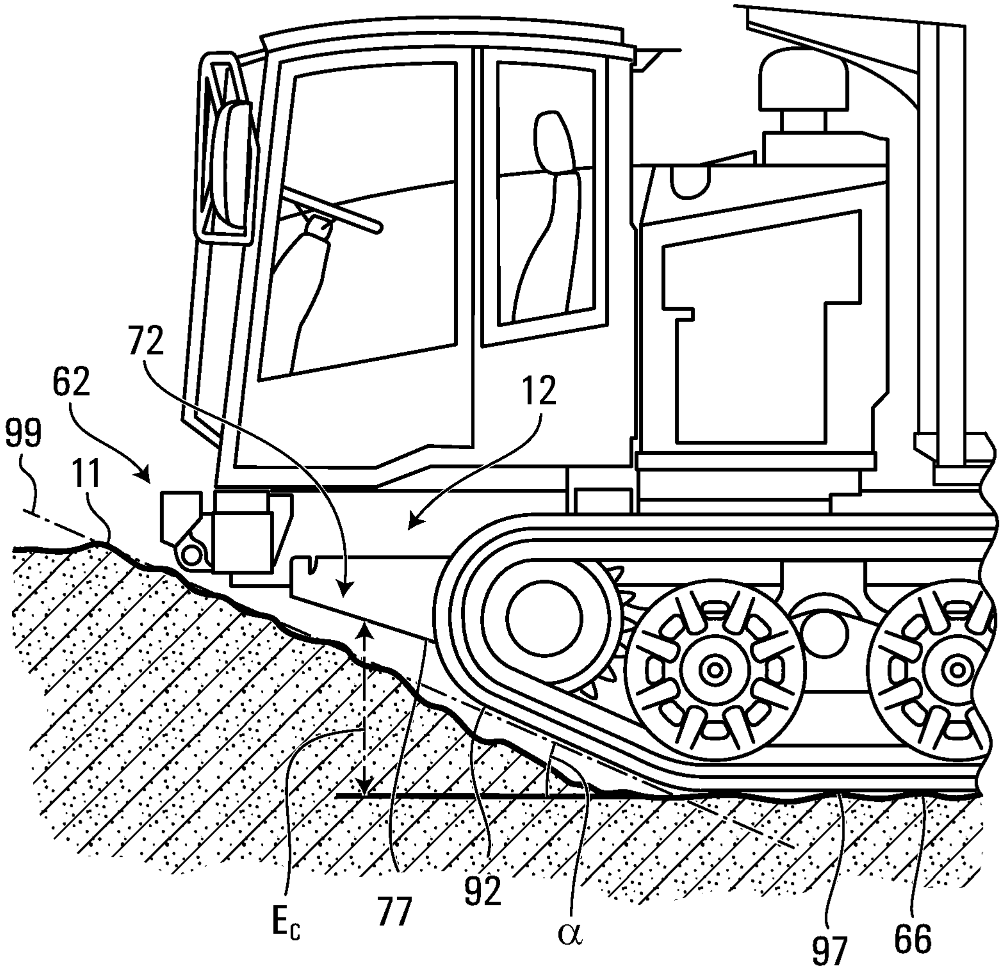
FIG. 13 is a partial side view of a front portion of the vehicle approaching a sloped portion of terrain.
Figure 14:
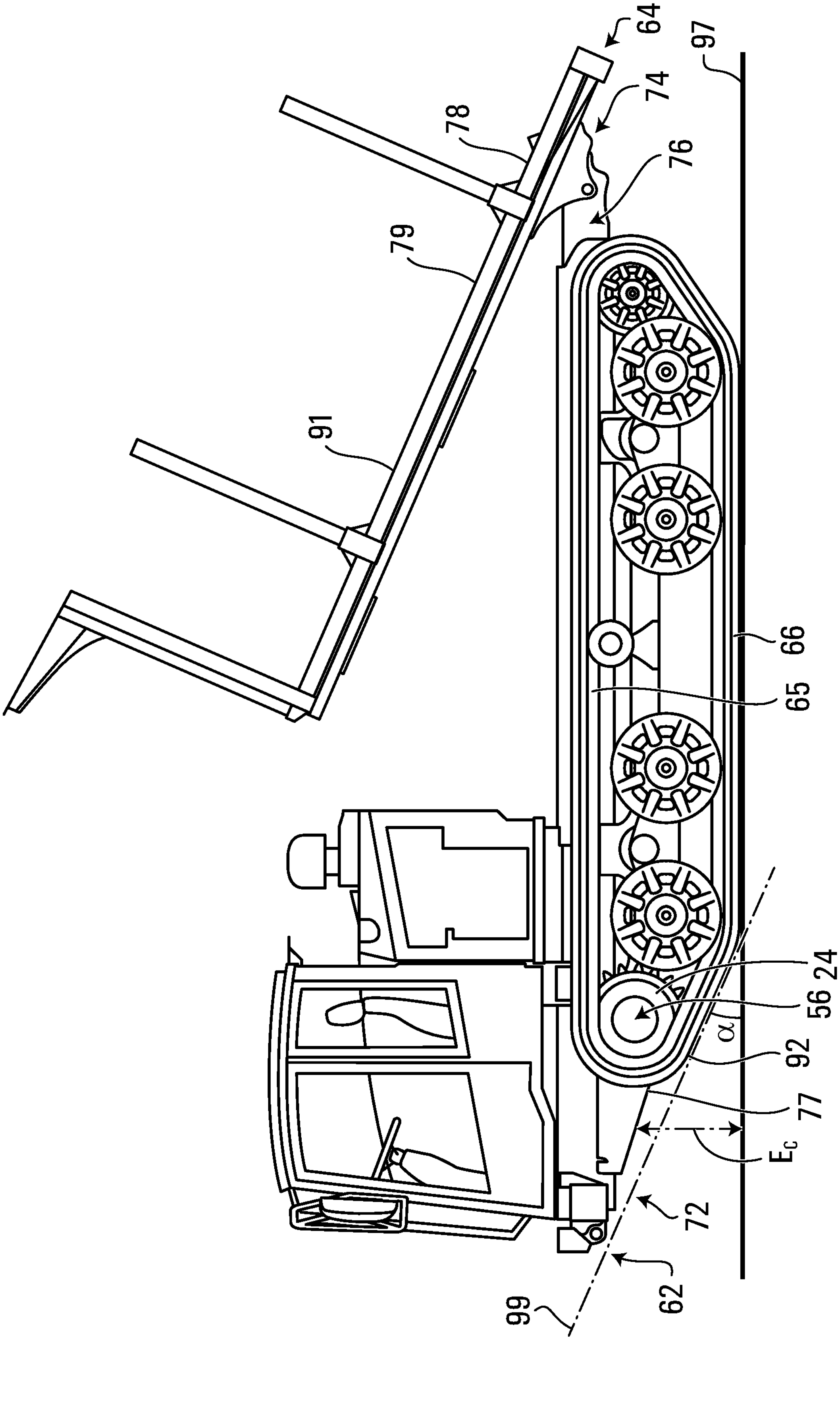
FIG. 14 is a side elevational view of another non-limiting embodiment of the tracked vehicle, with a work implement being rotated relative to a chassis of the vehicle about an axis extending in a widthwise direction of the tracked vehicle.
Figure 15:
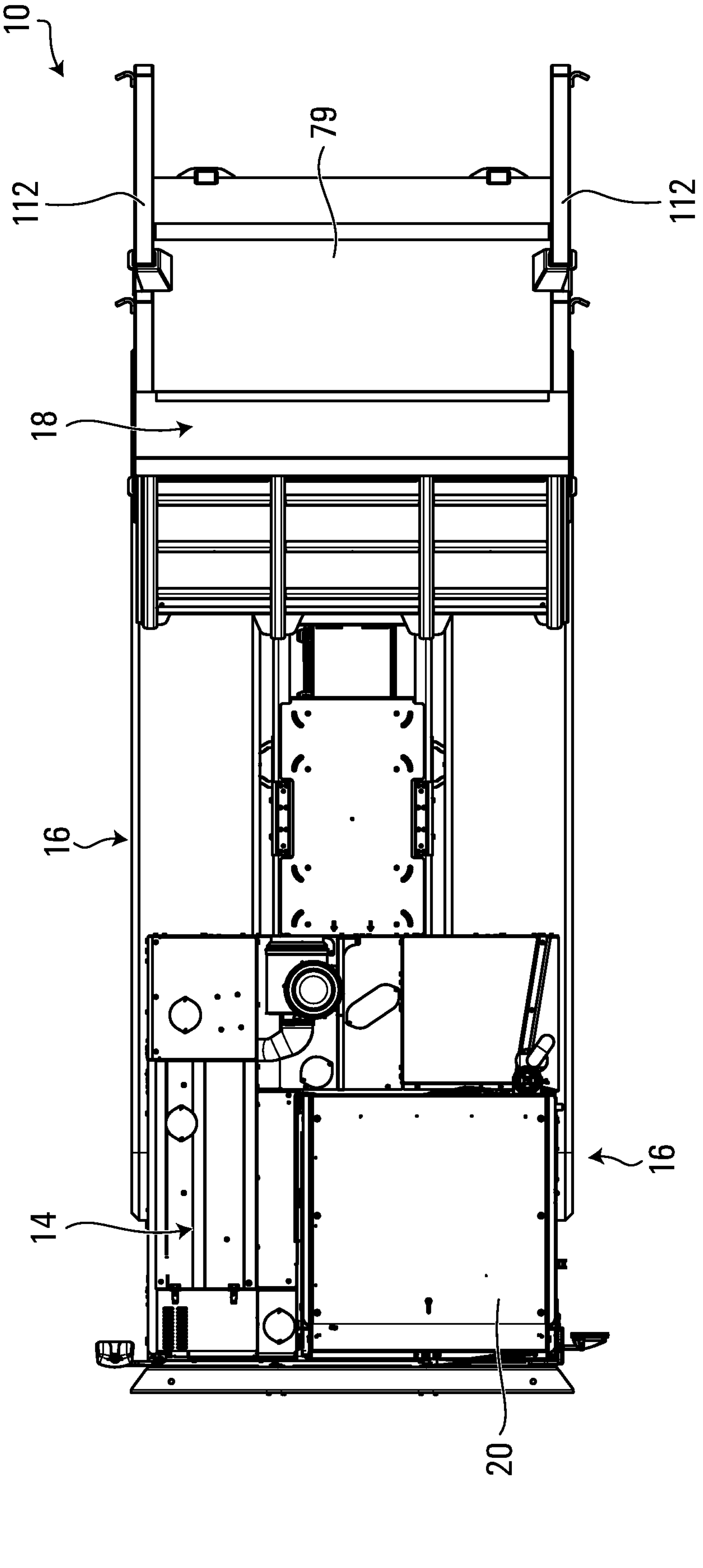
FIG. 15 is a plan view of a further non-limiting embodiment of the tracked vehicle, with a work implement being rotated relative to the chassis of the vehicle about an axis extending in a heightwise direction of the tracked vehicle.

One way of determining the maximum attack angle in the forward direction from the geometry of the vehicle 10 is now described with additional reference to FIGS. 4 and 13. In this embodiment, the chassis 12 may define a bottom of the front overhang portion 72 of the vehicle 10. Specifically, consider a distance between a bottom surface 77 of the chassis 12 and the first plane 97 (e.g., a flat ground surface) as being an elevation $E_C(x)$ of the chassis 12, where the x axis extends in the longitudinal direction of the vehicle 10 towards the rear end portion of the vehicle 10 and x=0 represents the front end portion 62 of the chassis 12. The value of $E_C(x)$ changes as x increases from x=0 to $x=L_{FO}$. While it generally decreases, the elevation $E_C(x)$ may fluctuate between x=0 and $x=L_{FO}$. Each value of $E_C(x)$ creates a respective angle $\alpha(x)$ with the frontmost limit of the bottom run of each of the two tracks 22. This frontmost limit of the bottom run of each of the two tracks 22 occurs at $x=L_{FO}+L_1$. As such:

$$\alpha(x)=\tan^{-1}(Ec(x)/(L_{FO}+L_{1-x})).$$

The smallest value of this angle, i.e., min {a (x)}, over x=0 to x=$L_{FO}$, is the maximum attack angle in the forward direction, denoted $\alpha_A$.

In some embodiments, a geometry of the track systems 16 may impose an upper bound to the maximum attack angle da. For instance, in some embodiments, an angle between (i) a first segment of the bottom run 66 of the track 22 between the drive wheel 24 and the first roller wheel 28 (in other words, between x=$L_{FO}$ and x=$L_{FO}$+$L_1$) and (ii) a second segment of the bottom run 66 of the track 22 between the roller wheels 28 may constitute the upper bound to the maximum attack angle da. In particular, the track system 16 may be configured to prevent a significant portion of the first segment of the track 22 from engaging the ground and/or support the vehicle 10. More particularly, in some embodiments, the geometry of the track system 16 may prevent the drive wheel 24 from supporting a part of the weight of the vehicle 10 to improve durability and to avoid deformation and premature deterioration of the drive wheel 24 and any gear, shaft or other driving component engaged with the drive wheel 24.

It is therefore noted that the geometry of the chassis 12 greatly influences the maximum attack angle da. More specifically, although there may be limited design freedom in choosing L1 (the length of the sloped portion of the tracks 22), there is considerable freedom in choosing the parameters $L_{FO}$ and $E_C$(x) which, when designing for a higher maximum attack angle da, tends to favor a decreasing value of $L_{FO}$ for the same values of $E_C$(x). Meanwhile, one needs to keep in mind the stability afforded by the front overhang portion 72 (to counterbalance the rear overhang portion 74) for greater load capacities. As such, there is a design tension between stability (greater values of $L_{FO}$) and angle of attack (smaller values of $L_{FO}$). It has been discovered that this tension can resolved with higher values of $E_C$(x), which allows greater values of $L_{FO}$ for greater stability at grater load capacities (with a non-zero $L_{RO}$), without compromising the maximum attack angle $\alpha_A$.

Higher values of $E_C$(x) can be achieved by providing an elevated chassis 12 and/or an elevated platform 18, as contemplated in the present disclosure. In the front, this has the effect of increasing the maximum attack angle da for the same value of $L_{FO}$, and therefore the vehicle 10 can attack a slope having a higher gradient, such as may be encountered at the beginning of uphill travel or at the bottom of a hill, without increasing the risk of tipping over frontwards or backwards.

In a specific non-limiting example, the front end 87 of the chassis 12 (i.e., the frontmost part of the front overhang portion 72) defines the lower bound for the maximum attack angle da. Stated differently, if one were to draw a second plane 99 that joins the front end of the chassis and the frontmost limit of the bottom run of each of the tracks 22, every part of the chassis 12 would be above the second plane 99, i.e., no portion of the chassis 12 intersects the second plane 99. The angle of intersection of the second plane 99 with the first plane 97 is the maximum attack angle $\alpha_A$.

Stated differently, the elevation of the chassis 12 at the front end of the chassis (i.e., $E_C$(x) at x=0), which is at a certain longitudinal distance (i.e., $L_{FO}$+$L_1$) from the frontmost limit of the bottom run of each of the tracks, divided by that certain longitudinal distance (i.e, $L_{FO}$+$L_1$), gives a value, whose arc tangent gives the maximum attack angle da, in a specific non-limiting embodiment.

As such, the desired maximum attack angle $\alpha_A$ of the vehicle 10 also means that the vehicle 10 can properly approach a slope of at least $\alpha_A$ relative to a level of the vehicle (the first plane 97). In order to satisfy this maximum attack angle αA, the elevation of the chassis 12 at the front end of the chassis 12, which is at a certain longitudinal distance from the frontmost point of the bottom run of each of the tracks, divided by that certain longitudinal distance, needs to be less than tan($\alpha_A$), for all values of the distance in the front overhang portion 72 of the chassis.

In the context of the foregoing, it has been discovered how to balance the requirement for load capacity (which has an impact on the overall chassis length), the requirement for stability (which has an impact on the ratio of the chassis length to the track length), and the requirement for maximum attack angle (which has an impact on the ratio of the elevation of the chassis (notably, in some embodiments, at the front end of the chassis) to the (longitudinal) distance between the front end of the chassis and the frontmost point of the bottom run of the tracks). The latter ratio can be the tangent of the maximum attack angle in some embodiments.

Referring to specific numerical examples, in one non-limiting embodiment, the length $L_V$ of the vehicle 10 may be about 6.725 m; a ratio of the length $L_V$ of the vehicle 10 to the length $L_{TS}$ of the track systems 16 may be about 1.50; a ratio of the length $L_P$ of the platform 18 to the length $L_{TS}$ of the track systems 16 may be about 0.85; the maximum angle of attack of the vehicle 10 may be about 22.5°; the minimal elevation $E_C$ of the chassis 12 in the front overhang 72 portion of the vehicle 10 may be a distance between the lowermost point of the front overhang portion 72 and the first plane 97, which may define a minimum elevation of the front overhang portion 72, which may be at least 0.40 m (e.g., between 0.40 m and 0.60 m), and more specifically may be about 0.45 m; the elevation $E_C$ of the chassis 12 at the front end 87 of the chassis 12 may be about 0.75 m; and a length $L_{FO}$ of the front overhang portion 72 may be about 1 m.

In other non-limiting embodiments, the length $L_V$ of the vehicle 10 may be at least 5.5 m (e.g., between 5.5 m and 8 m), at least 6 m (e.g., between 6 m and 7.5 m), or at least 6.5 m (e.g., between 6.5 m and 7 m). The ratio of the length $L_V$ of the vehicle 10 to the length $L_{TS}$ of the track systems 16 may be at least 1.25 (e.g., between 1.25 and 1.75), or at least 1.35 (e.g., between 1.35 and 1.65), or at least 1.45 (e.g., between 1.45 and 1.55). The ratio of the length $L_P$ of the platform 18 to the length $L_{TS}$ of the track systems 16 may be at least 0.65 (e.g., between 0.65 and 1.05), or at least 0.75 (e.g., between 0.75 and 0.95). The maximum angle of attack of the vehicle 10 may be at least 15° (e.g., between 15° and) 30°, more specifically at least 17.5° (e.g., between 17.5° and) 27.5°, and more specifically at least 20° (e.g., between 20° and) 25°. The minimal elevation $E_C$ of the chassis 12 in the front overhang portion 72 of the vehicle 10 may be at least 0.3 m (e.g., between 0.3 m and 0.6 m), and more specifically at least 0.4 m (e.g., between 0.4 m and 0.5 m). The elevation $E_C$ of the chassis 12 at the front end 87 of the chassis 12 may be at least 0.6 m (e.g., between 0.6 m and 0.9 m), and more specifically at least 0.7 m (e.g., between 0.7 m and 0.8 m). The length $L_{FO}$ of the front overhang portion 72 may be at least 0.7 m (e.g., between 0.7 m and 1.3 m), more specifically at least 0.8 m (e.g., between 0.8 m and 1.2 m), and more specifically at least 0.9 m (e.g., between 0.9 m and 1.1 m).

Although the above has considered the front end of the vehicle 10 and the front overhang portion 72, those skilled in the art will appreciate that a similar calculation and similar capabilities may be needed for the rear end of the vehicle 10 and the rear overhang portion 74 of the vehicle 10. In this embodiment, the rear end of the vehicle 10 is defined by the platform 18. The platform 18 is mounted on the chassis 12 and may define an elevation $E_P$ which, in some portions of the vehicle 10, may be different from (e.g., follow a different profile than, and have different values from) the elevation $E_C$ of the chassis. The maximum attack angle for the vehicle 10 in the rearwards direction may be defined as an angle between the plane 97 and a third plane 99' that intersects the first plane 97 at the rearmost limit 113 of the bottom run 66 of each of the tracks 22 (with the vehicle being steered neither to the right nor to the left). The greatest angle of intersection between the first and third planes that still allows the entire vehicle (and, in particular, the rear overhang portion 74) to lie above the third plane 99' is the maximum attack angle in the rearwards direction. Similarly to the maximum attack angle in the forward direction, one way of determining the maximum attack angle in the rearwards direction from the geometry of the vehicle 10 is to consider a distance between a bottom surface 77 of the chassis 12 and the first plane 97 (e.g., a flat ground surface) as being the elevation $E_C(x)$ of the chassis 12, and a distance between the bottom surface 91 of the platform 18 and the first plane 97 (e.g., a flat ground surface) as being the elevation $E_P(x)$ of the platform 18 where the x axis extends in the longitudinal direction of the vehicle 10 towards the rear end portion of the vehicle 10 and x=0 is aligned in the heightwise direction of the vehicle 10 with the rearmost limit of the bottom run 66 of the track 22. In this embodiment, the chassis 12 and the platform 18 may define a bottom of the rear overhang portion 74 of the vehicle 10. The values of $E_C(x)$ and $E_P(x)$ change as x increases from x=0 to $x=L_{RO}$. While they generally increase, the elevations $E_C(x)$ and $E_P(x)$ may fluctuate between x=0 and $x=L_{RO}$. Each value of $E_C(x)$ and $E_P(x)$ creates a respective angle $\beta(x)$ with the rearmost limit of the bottom run of each of the two tracks 22. This rearmost limit of the bottom run of each of the two tracks 22 occurs at $x=L_{RO}+L_2$. As such:

$$\beta(x)=\min\{\tan^{-1}(Ec(x)/x);\ \tan^{-1}(E_P(x)/x)\}$$

The smallest value of this angle, i.e., $\min\{\beta(x)\}$, over x=0 to $x=L_{RO}$, is the maximum attack angle in the rearwards direction, denoted $\beta_A$, which also means that the vehicle 10 can properly approach a slope of at least $\beta_A$ relative to a level of the vehicle (the first plane 97) in the rearwards direction.

In the rear of the vehicle 10, higher values of $E_C(x)$ can be achieved by providing an elevated chassis 12 and/or an elevated platform 18, as contemplated in the present disclosure. This has the effect of increasing the maximum attack angle $\beta_A$ for the same value of $L_{RO}$.

In order to satisfy the maximum attack angle $\beta_A$, the elevation of the chassis 12 at the rear end of the chassis 12, which is at a certain longitudinal distance from the rearmost point of the bottom run of each of the tracks, divided by that certain longitudinal distance, needs to be less than tan (BA), for all values of the distance in the rear overhang portion 74 of the chassis.

In the context of the foregoing, it has been discovered how to balance the requirement for load capacity (which has an impact on the overall chassis length and vehicle length), the requirement for stability (which has an impact on the ratios of the chassis length to the track length and of the vehicle length to the track length), and the requirement for maximum attack angle (which has an impact on the ratio of the elevation of the chassis and of the platform (notably, in some embodiments, at the rear end of the chassis and at the rear end of the platform) to the (longitudinal) distance between the rear ends of the chassis and platform and the rearmost point of the bottom run of the tracks). The latter ratio can be the tangent of the maximum attack angle in some embodiments.

In some embodiments, the geometry of the track systems 16 may impose an upper bound on the maximum attack angle $\beta_A$. For instance, in some embodiments, an angle between (i) a first segment of the bottom run 66 of the track 22 between the idler wheel 26 and the trailing roller wheel 28 and (ii) a second segment of the bottom run 66 of the track 22 between the roller wheels 28 may constitute the upper bound to the maximum attack angle $\beta_A$. In particular, the track system 16 may be configured to prevent a significant portion of the first segment of the track 22 to engage the ground and/or support the vehicle 10. More particularly, in some embodiments, the geometry of the track system 24 may prevent the idler wheel 26 from supporting a part of the weight of the vehicle 10 to improve durability and to avoid deformation and premature deterioration of the idler wheel 26 and any component engaged with the idler wheel 26.

In this embodiment, because the platform 18 is mounted over the chassis 12 and comprises the rear end of the vehicle 10, this may tend to increase the length $L_{RO}$ of the rear overhang portion 74 relative to the length $L_{FO}$ of the front overhang portion 72. Nevertheless, in this embodiment, a ratio of the length $L_{RO}$ of the rear overhang portion over the length $L_{FO}$ of the front overhang portion may be kept relatively small to maintain a center of gravity above the track systems 16 when the vehicle 10 is operating either with or without a payload. For instance, in some embodiments, the ratio of the length $L_{RO}$ of the rear overhang portion 74 over the length $L_{FO}$ of the front overhang portion 72 may be between 1.05 and 1.10; however, this is not a requirement, and in some cases this ration may be between 1 and 1.15 or between 1 and 1.20, and in some cases it may even be between 0.95 and 1, i.e., the rear overhang portion 74 is shorter than the front overhang portion 72.

Referring to specific numerical examples, in one non-limiting embodiment, the maximum angle of attack of the vehicle 10 in the rearwards direction may be about 25°; the minimal elevation $E_C$ of the chassis 12 in the rear overhang portion 74 of the vehicle 10 may be a distance between a lowermost point of the rear overhang portion 74 of the vehicle 10 and the first plane 97, which may define a minimum elevation of the rear overhang portion 74, which may be at least 0.60 m (e.g., between 0.60 m and 0.90 m), and more specifically may be about 0.75 m; the minimal elevation $E_P$ of the platform 18 across its length may be about 1.00 m; the elevation $E_C$ of the chassis 12 at the rear end 89 of the chassis 12 may be about 0.85 m; the elevation $E_P$ of the platform 18 at the rear end of the platform 18 may be about 1.00 m; and a length $L_{RO}$ of the rear overhang portion 74 may be about 1.00 m.

In other non-limiting embodiments, the maximum angle of attack of the vehicle 10 in the rearward direction may be at least 15° (e.g., between 15° and) 35°, more specifically at least 20° (e.g., between 20° and) 30°, and more specifically at least 25° (e.g., between 25° and) 27.5°. The minimal elevation $E_C$ of the chassis 12 in the rear overhang portion 74 of the vehicle 10 may be at least 0.3 m (e.g., between 0.3 m and 1.0 m), and more specifically at least 0.6 m (e.g., between 0.6 m and 0.9 m). The minimal elevation $E_P$ of the platform 18 in the rear overhang portion 74 of the vehicle 10 may be at least 0.6 m (e.g., between 0.6 m and 1.4 m), and more specifically at least 0.9 m (e.g., between 0.9 m and 1.1 m). The elevation $E_C$ of the chassis 12 at the rear end 89 of the chassis 12 may be at least 0.6 m (e.g., between 0.6 m and 1.1 m), and more specifically at least 0.8 m (e.g., between 0.8 m and 0.9 m). The elevation $E_P$ of the platform 18 at the rear end of the platform 18 may be at least 0.9 m (e.g., between 0.9 m and 1.2 m), and more specifically at least 1.0 m (e.g., between 1.0 m and 1.1 m). The length $L_{RO}$ of the rear overhang portion 74 may be at least 0.8 m (e.g., between 0.8 m and 1.3 m), more specifically at least 0.9 m (e.g., between 0.9 m and 1.2 m), and more specifically at least 1.0 m (e.g., between 1.0 m and 1.1 m).

The operator cabin 20 may be configured to facilitate the operation of the vehicle 10 by the operator. In some embodiments, the operator cabin 20 is configured to allow the operator to better see the terrain 11 while operating the vehicle 10. This may be useful, particularly when the vehicle is traveling near or being operated at the edge of a cliff. To this end, the operator seat 71 and the steering device 75 (e.g., a steering wheel) may be disposed on one side of the operator cabin 20 rather than in the widthwise center of the operator cabin 20. More specifically, when the operator cabin 20 is on a left side of the chassis, this may be achieved by disposing the operator seat 71 and the steering device 75 on the left side of the operator cabin 20, adjacent to the left window of the operator cabin 20, and when the operator cabin 20 is on a right side of the chassis, this may be achieved by disposing the operator seat 71 and the steering device 75 on the right side of the operator cabin 20, adjacent to the right window of the operator cabin 20. In this embodiment, the operator cabin 70 further comprises a passenger seat 73 adjacent the operator seat 71.

For instance, in some embodiments, a distance DL between a widthwise center of the operator seat 71 and an outer lateral edge 491 of the track 22 of a closer one of the track systems 16 in the widthwise direction of the vehicle 10 is less than 1.10 m (e.g., between 0.25 m and 1.10 m), in some embodiments less than 0.75 m (e.g., between 0.25 m and 0.75 m), in some embodiments less than 0.40 m (e.g., between 0.25 m and 0.40 m); a distance between the widthwise center of the operator seat 71 and an outer lateral edge 491 of the track 22 of the other the track system 16 in the widthwise direction of the vehicle 10 is at least 1.10 m (e.g., between 1.10 m and 1.50 m), in some embodiments at least 1.20 m (e.g., between 1.20 m and 1.40 m), in some embodiments at least 1.25 m (e.g., between 1.25 m and 1.35 m), and in some embodiments even more; and a ratio of the distance DL over a width of the vehicle 10 is less than 0.60 (e.g., between 0 and 0.60), in some embodiments less than 0.50 (e.g., between 0.10 and 0.50), and in some embodiments less than 0.40 (e.g., between 0.20 and 0.40). Furthermore, in some embodiments, a distance $D_{WL}$ between the widthwise center of the operator seat 70 and the first lateral window 81 in the widthwise direction of the vehicle 10 may be less than 1 m (e.g., between 0.25 m and 1 m), in some embodiments less than 0.65 m (e.g., between 0.25 m and 0.65 m), in some embodiments less than 0.30 m (e.g., between 0.25 m and 0.30 m); and a distance $D_{WR}$ between the widthwise center of the operator seat 71 and the second lateral window 82 in the widthwise direction of the vehicle 10 may be at least 1 m (e.g., between 1 m and 1.50 m), in some embodiments at least 1.10 m (e.g., between 1.10 m and 1.40 m), in some embodiments at least 1.20 m (e.g., between 1.20 m and 1.30 m), and in some embodiments even more.

Naturally, when discussing the operator cabin 20, the reference to left and right can be swapped in cases where the vehicle is made for a market or customer whose operators are more accustomed to sitting on the right-hand side of the vehicle when operating it.

Figure 16:
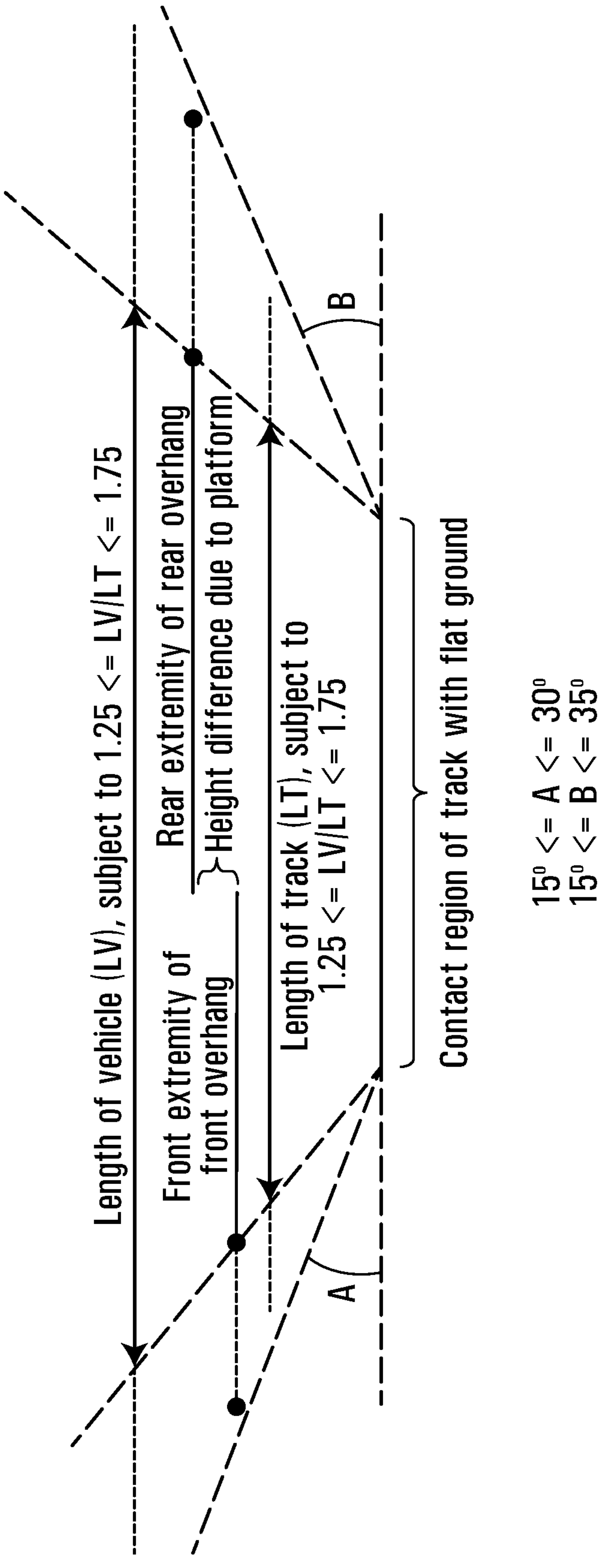
FIG. 16 is a schematic diagram illustrating various geometric constraints satisfied by the tracked vehicle, according to a non-limiting example embodiment.

Thus, the foregoing has shown has provided a description of an innovative tracked vehicle that comprises a body extending in a longitudinal direction of the tracked vehicle, the body having a front end and a rear end defining a length of the body, a first track system mounted on a first lateral side of the body and a second track system mounted on a second lateral side of the body, each track system comprising a front end and a rear end defining a length of the respective track system. Each track system further comprises a track that comprises a ground-engaging outer surface and an inner surface opposite the ground-engaging outer surface, the track comprising a top run and a bottom run, the ground-engaging outer surface of the bottom run defining an area of contact configured to engage the ground during use, and a track-engaging assembly configured to drive and guide the track around the track-engaging assembly, the track-engaging assembly comprising a plurality of track-contacting wheels and a frame supporting respective ones of the track-contacting wheels. The vehicle also comprises an operator cabin mounted to the body, the operator cabin comprising an operator interface for allowing an operator of the tracked vehicle to enter operator commands to operate the tracked vehicle and a powertrain mounted to a portion of the body and comprising a prime mover. Moreover, the body comprises a front overhang portion and a rear overhang portion. With additional reference to FIG. 16, a ratio of the length of the vehicle (LV) to the length of each track system (LT) is between 1.25 and 1.75. Also, an entirety of the front overhang portion is above a second plane passing through a frontmost point of the bottom run of the track and defining an angle A between 15° and 30° with a first plane defined by an area of contact of the track with flat ground, and an entirety of the rear overhang portion is above a third plane passing through a rearmost point of the bottom run of the track and defining an angle B between 15° and 35° with the first plane.

Although the illustrated vehicle 10 comprises a rigid chassis, in some embodiments, the chassis 12 may comprise a lower structure 76 and an upper structure 78 that is movable relative to the lower structure 76. The lower structure 76 may be configured to support components of the vehicle 10 that are lower in the heightwise direction of the vehicle 10, such as the track systems 16, at least part of the powertrain 15, etc., which are mounted on the lower structure 76, and the upper structure 78 may be configured to support components of the vehicle 10 that are higher in the heightwise direction of the vehicle 10, such as the operator cabin 10, the platform 18, part of the powertrain 15, etc., which are mounted on the upper structure 78.

In some embodiments, the upper structure 78 may be rotatable relative to the lower structure 76 about an axis extending in a height-wise direction of the vehicle 10 (i.e., parallel to the steering axis 96). In such an embodiment, the vehicle 10 would comprise a motor for rotating the upper structure 78 relative to the lower structure 76.

Although the illustrated vehicle 10 comprises a single-track system on each lateral side of the vehicle, this is not to be considered limiting, as in other embodiments, there may be two or more track systems on each lateral side of the vehicle.

Although in embodiments considered above, the vehicle 10 is operable by a user from the operator cabin 20, in some embodiments, the vehicle 10 may be operable by a user remotely. In still other embodiments, the vehicle 10 may comprise autonomy features, allowing the vehicle 10 to be semi-autonomous and/or entirely autonomous. In some embodiments, the vehicle 10 may even be free of any operator cabin.

Although in embodiments considered above the vehicle 10 is a forwarder, in other embodiments, some of the above features may be provided in another type of forestry vehicle, an agricultural vehicle, an industrial vehicle, a military vehicle, or other vehicle operable off paved roads. Although operable off paved roads, the vehicle 10 may also be operable on paved roads in some cases.

In some examples of implementation, any feature of any embodiment described herein may be used in combination with any feature of any other embodiment described herein.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

In case of any discrepancy, inconsistency, or other difference between terms used herein and terms used in any document incorporated by reference herein, meanings of the terms used herein are to prevail and be used.

Although various embodiments and examples have been presented, this was for purposes of description, but should not be considered limiting. Various modifications and enhancements will become apparent to those of ordinary skill in the art.

The invention claimed is:

1. A tracked vehicle comprising:

a body extending in a longitudinal direction of the tracked vehicle, the body having a front end and a rear end defining a length of the body;

a first track system mounted on a first lateral side of the body and a second track system mounted on a second lateral side of the body, each track system comprising a front end and a rear end defining a length of the respective track system, each track system further comprising:

a track that comprises a ground-engaging outer surface and an inner surface opposite the ground-engaging outer surface, the track comprising a top run and a bottom run, the ground-engaging outer surface of the bottom run defining an area of contact configured to engage the ground during use, and a track-engaging assembly configured to drive and guide the track around the track-engaging assembly, the track-engaging assembly comprising a plurality of track-contacting wheels and a frame supporting respective ones of the track-contacting wheels;

an operator cabin mounted to the body, the operator cabin comprising an operator interface for allowing an operator of the tracked vehicle to enter operator commands to operate the tracked vehicle; and a powertrain mounted to a portion of the body and comprising a prime mover;

wherein the body comprises a front overhang portion and a rear overhang portion;

wherein a ratio of the length of the vehicle to the length of each track system is between 1.25 and 1.75;

wherein an entirety of the front overhang portion is above a second plane passing through a frontmost point of the bottom run of the track and defining an angle between 15° and 30° with a first plane defined by an area of contact of the track with flat ground;

wherein an entirety of the rear overhang portion is above a third plane passing through a rearmost point of the bottom run of the track and defining an angle between 150 and 350 with the first plane; and wherein a majority of the operator cabin is longitudinally in front of the front end of the track system.

2. The tracked vehicle of claim 1, wherein a distance between a lowermost point of the front overhang portion and the first plane defines a minimum elevation of the front overhang portion and is between 0.40 m and 0.60 m, and wherein a distance between a lowermost point of the rear overhang portion and the first plane defines a minimum elevation of the rear overhang portion and is between 0.60 m and 0.90 m.

3. The tracked vehicle of claim 1, wherein a distance between a bottom of the front end of the body and the first plane is between 0.6 m and 0.9 m.

4. The tracked vehicle of claim 1, wherein a distance between a bottom of the rear end of the body and the first plane is between 0.3 m and 0.6 m.

5. The tracked vehicle of claim 1, wherein the front overhang portion has a length of between 0.7 m and 1.3 m.

6. The tracked vehicle of claim 1, wherein a ratio of a length of the front overhang portion to the length of the vehicle is between 0.10 and 0.25.

7. The tracked vehicle of claim 1, wherein the rear overhang portion has a length of between 0.7 m and 1.3 m.

8. The tracked vehicle of claim 1, wherein a ratio of a length of the rear overhang portion to the length of the vehicle is between 0.10 and 0.25.

9. The tracked vehicle of claim 1, wherein a mass center of the tracked vehicle is located in a frontmost third of the length of the vehicle in the longitudinal direction of the tracked vehicle when the tracked vehicle is unloaded.

10. The tracked vehicle of claim 9, wherein a distance between a front end of the tracked vehicle and the mass center of the tracked vehicle is between 1.4 m and 2.0 m in the longitudinal direction of the tracked vehicle.

11. The tracked vehicle of claim 1, wherein a portion of the powertrain is longitudinally in front of the front end of each track system.

12. The tracked vehicle of claim 1, wherein a majority of the powertrain is longitudinally in front of the front end of each track system.

13. The tracked vehicle of claim 1, wherein the body is a chassis and the tracked vehicle comprises a platform mounted on the chassis.

14. The tracked vehicle of claim 13, wherein the platform has a length of between 3.5 m and 4.5 m, wherein a ratio of a length of the platform over the length of each track systems is between 0.65 and 1.05, wherein the platform has a loading surface area of between 7 $m^2$ and 10 $m^2$, wherein a minimal elevation of the platform is between 0.6 m and 1.4 m and wherein the platform is configured to receive a payload of between 6000 kg and 9000 kg over a surface area of between 7 $m^2$ and 10 $m^2$.

15. The tracked vehicle of claim 13, wherein the platform is movable relative to the chassis.

16. The tracked vehicle of claim 13, wherein the platform is rotatable relative to the chassis about an axis extending in the widthwise direction of the tracked vehicle.

17. The tracked vehicle of claim 16, comprising a motor for rotating the platform about the chassis.

18. The tracked vehicle of claim 1, wherein the track is a metal embedded rubber track (MERT).

19. A tracked vehicle comprising:

a body extending in a longitudinal direction of the tracked vehicle, the body having a front end and a rear end defining a length of the body;

a first track system mounted on a first lateral side of the body and a second track system mounted on a second lateral side of the body, each track system comprising a front end and a rear end defining a length of the respective track system, each track system further comprising:

a track that comprises a ground-engaging outer surface and an inner surface opposite the ground-engaging outer surface, the track comprising a top run and a bottom run, the ground-engaging outer surface of the bottom run defining an area of contact configured to engage the ground during use, and a track-engaging assembly configured to drive and guide the track around the track-engaging assembly, the track-engaging assembly comprising a plurality of track-contacting wheels and a frame supporting respective ones of the track-contacting wheels;

an operator cabin mounted to the body, the operator cabin comprising an operator interface for allowing an operator of the tracked vehicle to enter operator commands to operate the tracked vehicle; and a powertrain mounted to a portion of the body and comprising a prime mover;

wherein the body comprises a front overhang portion and a rear overhang portion;

wherein a ratio of the length of the vehicle to the length of each track system is between 1.25 and 1.75;

wherein an entirety of the front overhang portion is above a second plane passing through a frontmost point of the bottom run of the track and defining an angle between 150 and 300 with a first plane defined by an area of contact of the track with flat ground;

wherein an entirety of the rear overhang portion is above a third plane passing through a rearmost point of the bottom run of the track and defining an angle between 150 and 350 with the first plane; and wherein a portion of the powertrain is longitudinally in front of the front end of each track system.

20. A tracked vehicle comprising:

a body extending in a longitudinal direction of the tracked vehicle, the body having a front end and a rear end defining a length of the body;

a first track system mounted on a first lateral side of the body and a second track system mounted on a second lateral side of the body, each track system comprising a front end and a rear end defining a length of the respective track system, each track system further comprising:

a track that comprises a ground-engaging outer surface and an inner surface opposite the ground-engaging outer surface, the track comprising a top run and a bottom run, the ground-engaging outer surface of the bottom run defining an area of contact configured to engage the ground during use, and a track-engaging assembly configured to drive and guide the track around the track-engaging assembly, the track-engaging assembly comprising a plurality of track-contacting wheels and a frame supporting respective ones of the track-contacting wheels;

an operator cabin mounted to the body, the operator cabin comprising an operator interface for allowing an operator of the tracked vehicle to enter operator commands to operate the tracked vehicle; and a powertrain mounted to a portion of the body and comprising a prime mover;

wherein the body comprises a front overhang portion and a rear overhang portion;

wherein a ratio of the length of the vehicle to the length of each track system is between 1.25 and 1.75;

wherein an entirety of the front overhang portion is above a second plane passing through a frontmost point of the bottom run of the track and defining an angle between 150 and 300 with a first plane defined by an area of contact of the track with flat ground;

wherein an entirety of the rear overhang portion is above a third plane passing through a rearmost point of the bottom run of the track and defining an angle between 150 and 350 with the first plane; and wherein a majority of the powertrain is longitudinally in front of the front end of each track system.

* * * * *